US008788840B2

(12) United States Patent
Goto

(10) Patent No.: US 8,788,840 B2
(45) Date of Patent: *Jul. 22, 2014

(54) SECURE PROCESSOR

(71) Applicant: Fujitsu Semiconductor Limited, Yokohama (JP)

(72) Inventor: Seiji Goto, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,535

(22) Filed: Mar. 8, 2013

(65) Prior Publication Data

US 2013/0198526 A1 Aug. 1, 2013

Related U.S. Application Data

(62) Division of application No. 11/456,437, filed on Jul. 10, 2006, now Pat. No. 8,468,364.

(30) Foreign Application Priority Data

Feb. 22, 2006 (JP) ................. 2006-046051

(51) Int. Cl.
G06F 21/00 (2013.01)
(52) U.S. Cl.
USPC .......... 713/187; 713/164; 713/169; 713/189; 713/190; 711/100; 711/E12.102
(58) Field of Classification Search
USPC ................................ 713/187, 189
See application file for complete search history.

(56) References Cited

U.S. PATENT DOCUMENTS

| 4,987,595 | A | 1/1991 | Marino et al. |
| 5,937,063 | A | 8/1999 | Davis |
| 7,831,839 | B2 * | 11/2010 | Hatakeyama ................. 713/187 |
| 2004/0093505 | A1 | 5/2004 | Hatakeyama et al. |
| 2004/0143748 | A1 | 7/2004 | Yamaguchi et al. |
| 2004/0158742 | A1 * | 8/2004 | Srinivasan et al. ............ 713/201 |
| 2005/0136949 | A1 | 6/2005 | Barnes, Jr. |

(Continued)

FOREIGN PATENT DOCUMENTS

| EP | 1 202 150 A2 | 5/2002 |
| JP | 2002-353960 | 12/2002 |

(Continued)

OTHER PUBLICATIONS

U.S. Appl. No. 11/456,437, filed Jul. 10, 2006, Seiji Goto, Fujitsu Semiconductor Limited, Kanagawa, Japan.

(Continued)

Primary Examiner — Jason Lee
(74) Attorney, Agent, or Firm — Staas & Halsey LLP

(57) ABSTRACT

A secure hardware comprises a secure pipe, a secure DMA, a secure assist and a secure bus, which connects between those blocks. The secure pipe stores a common encryption key in an encryption key table so as not to be able to access from software. The secure DMA comprises a data common key system process function and a hashing process function. The secure assist comprises a common key system process function and an authentication process function, receives an issued command from a program executed by the processor core via a public IF, and performs setting/control of the secure pipe and the secure DMA via the secure bus.

17 Claims, 32 Drawing Sheets

(56) References Cited

U.S. PATENT DOCUMENTS

| | | |
|---|---|---|
| 2005/0268093 A1 | 12/2005 | Proudler |
| 2006/0015748 A1 | 1/2006 | Goto et al. |
| 2006/0179302 A1 | 8/2006 | Hatakeyama |
| 2006/0179324 A1 | 8/2006 | Hatakeyama |

FOREIGN PATENT DOCUMENTS

| | | |
|---|---|---|
| JP | 2003-101529 | 4/2003 |
| JP | 2005-018379 | 1/2005 |
| JP | 2005-099984 | 4/2005 |
| JP | 2006-018528 | 1/2006 |
| WO | 00/10283 | 2/2000 |
| WO | 2004/006075 | 1/2004 |

OTHER PUBLICATIONS

European Search Report issued Jun. 8, 2009 for corresponding European Patent Application 06253618.0.

European Communication issued in corresponding European Application 06 253 618.01245; dated Jul. 14, 2010.

Japanese Office Action for corresponding Japanese Application 2006-046051; mailed May 10, 2011.

U.S. Office Action mailed Jul. 20, 2009 in parent U.S. Appl. No. 11/456,437.

U.S. Office Action mailed Feb. 16, 2010 in parent U.S. Appl. No. 11/456,437.

U.S. Final Office Action mailed Jul. 19, 2010 in parent U.S. Appl. No. 11/456,437.

U.S. Advisory Action mailed Dec. 10, 2010 in parent U.S. Appl. No. 11/456,437.

U.S. Office Action mailed Jun. 26, 2012 in parent U.S. Appl. No. 11/456,437.

U.S. Notice of Allowance mailed Feb. 21, 2013 in parent U.S. Appl. No. 11/456,437.

* cited by examiner

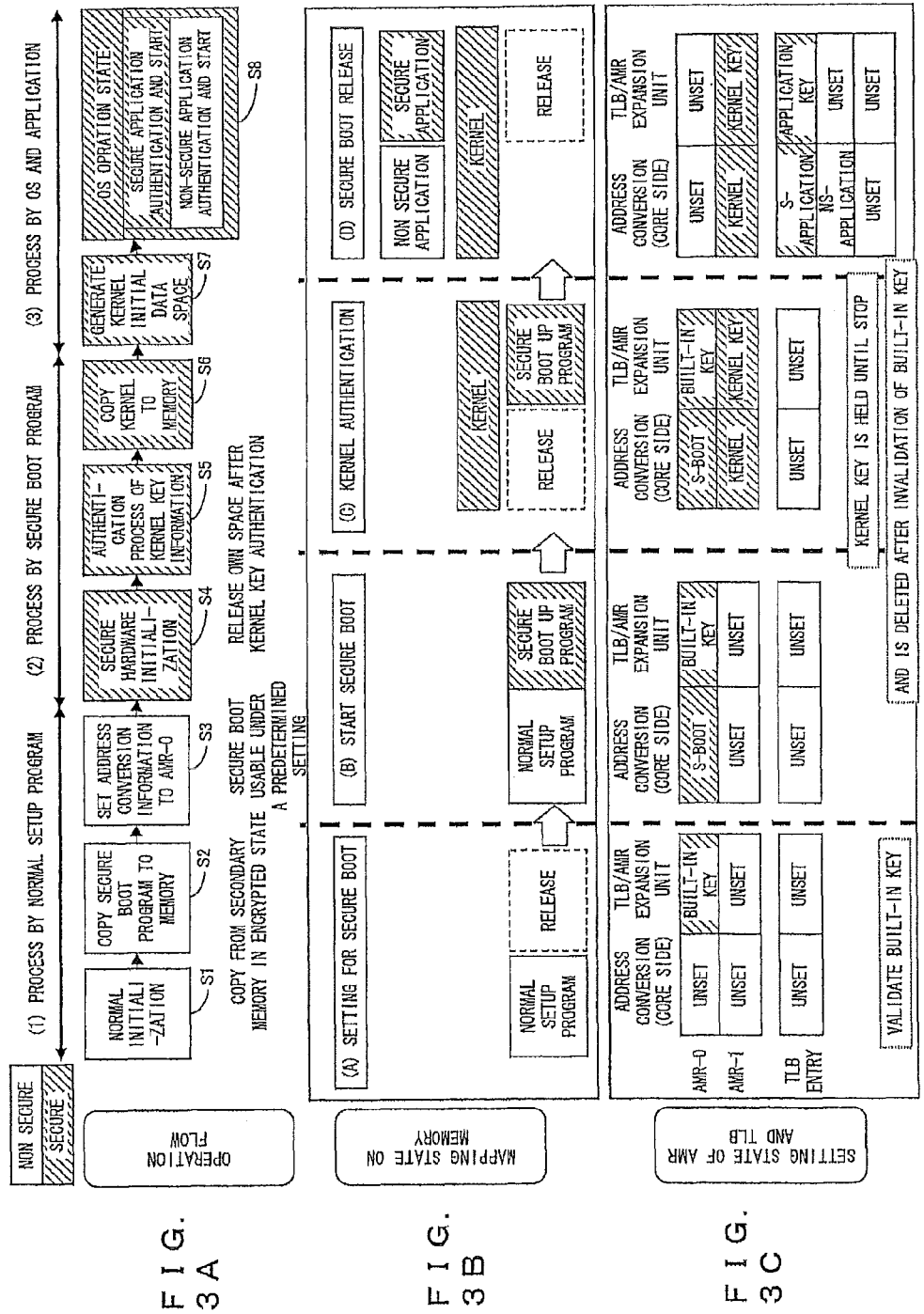

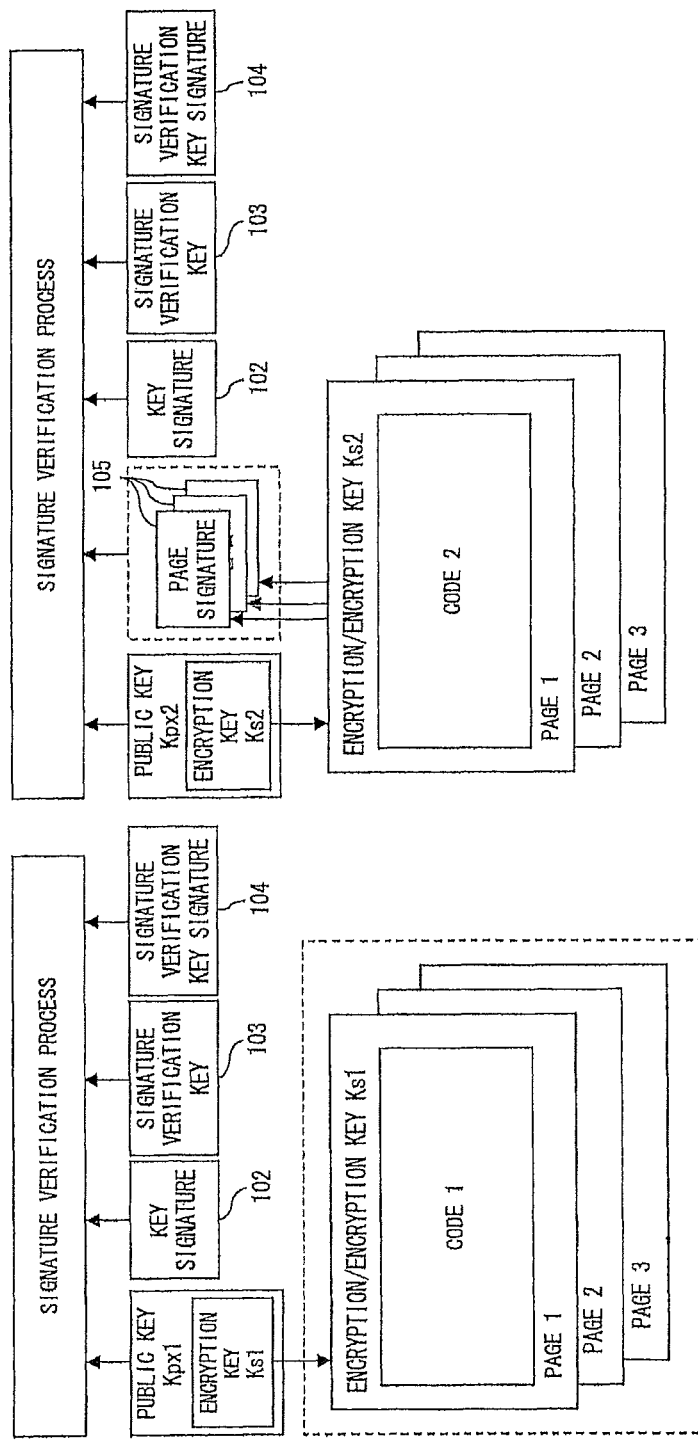

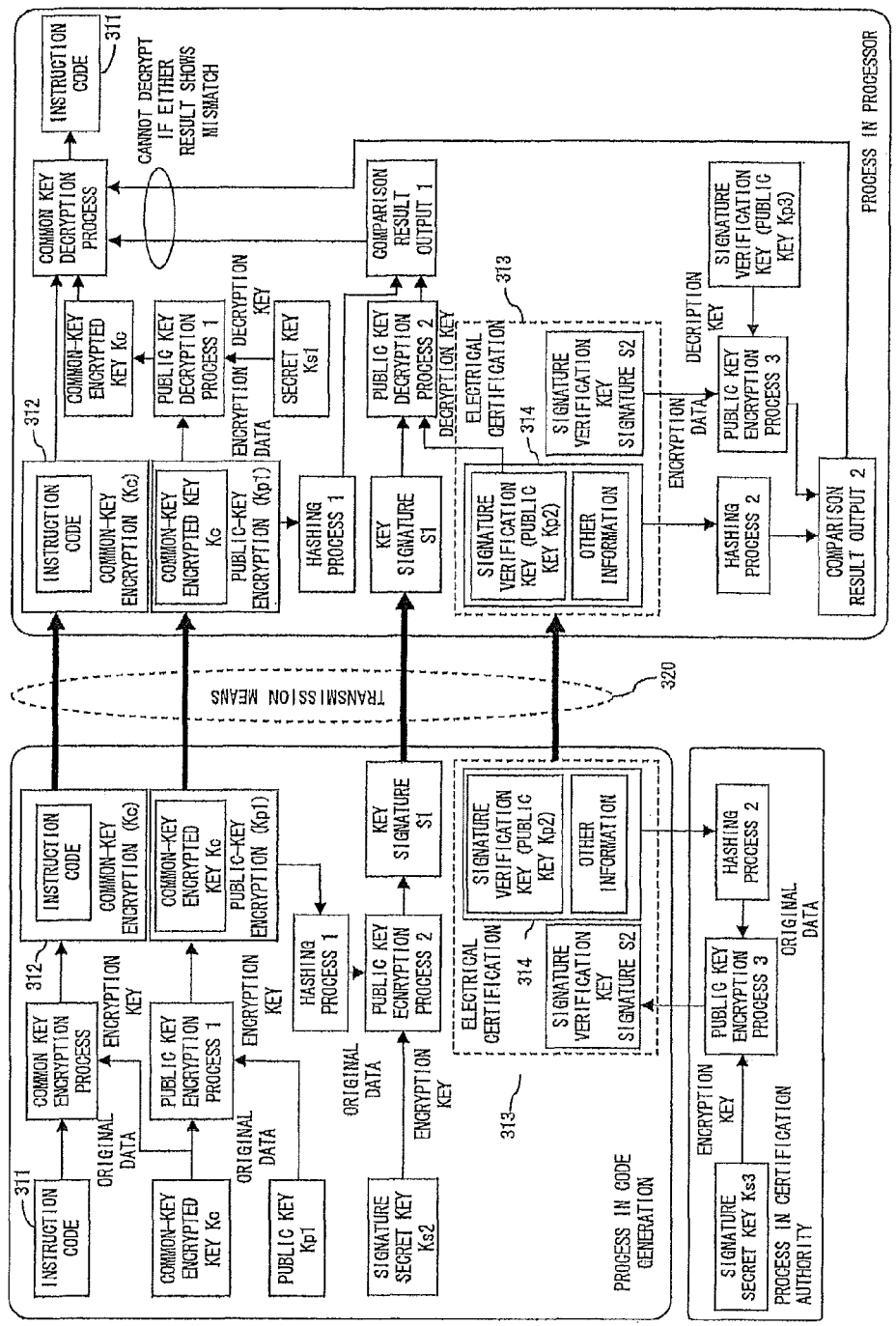
F I G. 4 D

| | ATTRIBUTION OF PROGRAM IN EXECUTION | ACCESS TARGET | SECURE PIPE ACCESS | BUS INTERFACE PROCESS | EXECUTION RESULT |
|---|---|---|---|---|---|
| 1 | S=1 AUTHENTICATED PROGRAM | S=1 AUTHENTICATED DATA SPACE | ○ OPERATED | ENCRYPTION/ DECRYPTION PROCESS | NORMAL DATA ACCESSIBLE (NORMAL ASSURANCE) |
| 2 | S=1 AUTHENTICATED PROGRAM | S=0 UNAUTHENTICATED DATA SPACE | ○ OPERATED | UNPROCESSED (BYPASS) | NORMAL DATA ACCESSIBLE (NO NORMAL ASSURANCE) |
| 3 | S=0 UNAUTHENTICATED PROGRAM | S=1 AUTHENTICATED DATA SPACE | × PROHIBITED | CANNOT BE PROCESSED | CANNOT BE PROCESSED FOR IT IS ENCRYPTED DATA |
| 4 | S=0 UNAUTHENTICATED PROGRAM | S=0 UNAUTHENTICATED DATA SPACE | × UNNECESSARY | UNPROCESSED (BYPASS) | NORMAL DATA ACCESSIBLE (NO NORMAL ASSURANCE) |

FIG. 5B

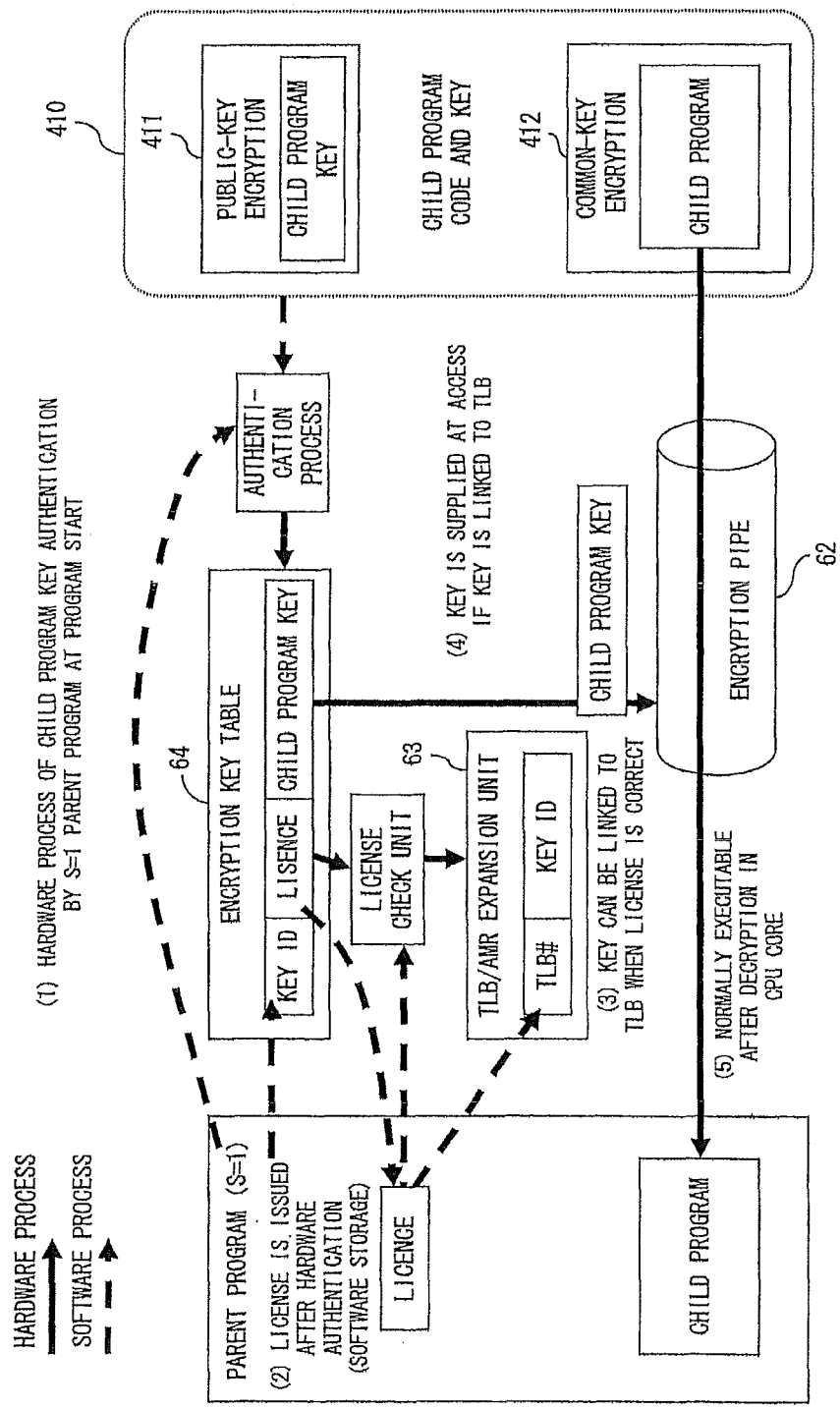
F I G. 6

| ENTRY NUMBER | KEY ATTRIBUTE (16bit) | S-BIT (1bit) | ENCRYPTION KEY (256bit) | LICENSE INFORMATION (32bit) RANDOM NUMBER GENERATION AT REGISTRATION |
|---|---|---|---|---|
| ENTRY 0 | | | | |
| ENTRY 1 | SORTWARE ACCESS PERMITTED | | SOFTWARE ACCESS NOT PERMITTED | |
| ENTRY 2 | | | | |

64

F I G. 7

| ENTRY NUMBER | S-BIT (1bit) | KEY ID (8bit) | LICENSE INFORMATION (16bit) (LOWER 16bits OF ENCRYPTION KEY LICENSE) 63 |
|---|---|---|---|
| ENTRY 0 | | | |
| ENTRY 1 | SOFTWARE ACCESS PERMITTED | | SOFTWARE ACCESS NOT PERMITTED |
| ENTRY 2 | | | |

FIG. 8

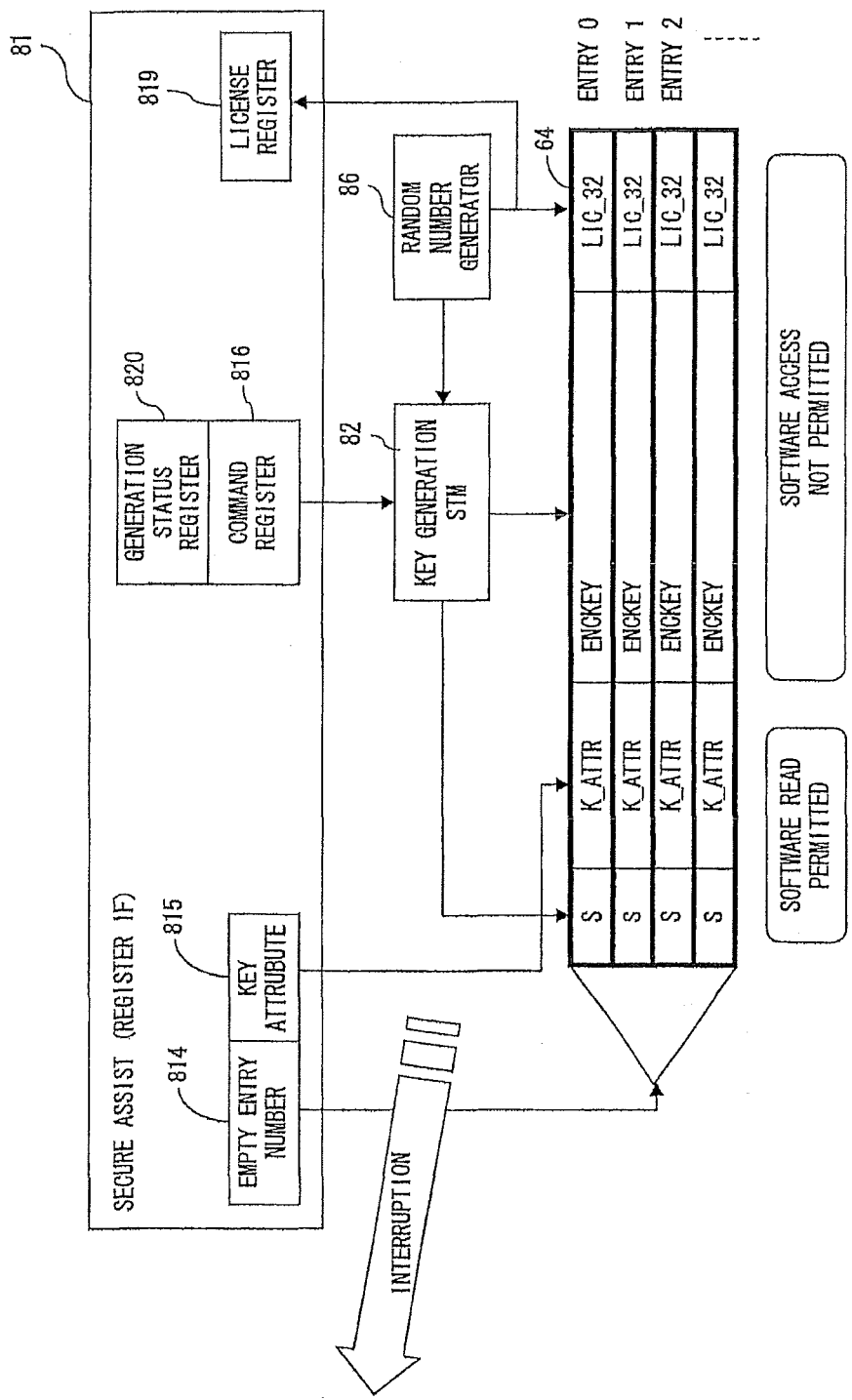
F I G. 11A

FIG. 12A

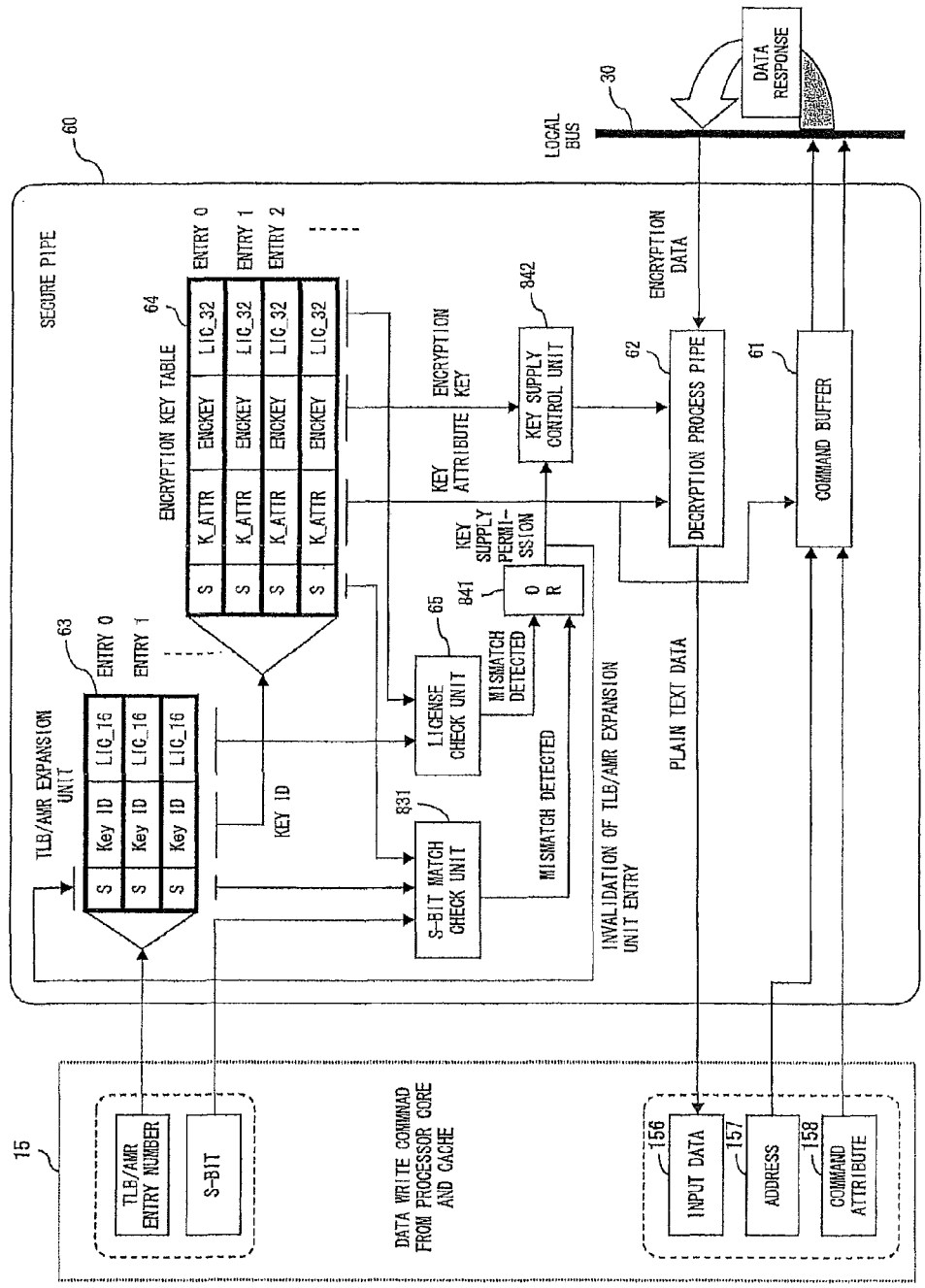
F I G. 18

SECURE PROCESSOR

CROSS-REFERENCE TO RELATED APPLICATIONS

This application is a divisional of U.S. patent application Ser. No. 11/456,437 filed Jul. 10, 2006 and which is pending and claims the benefit of priority from the prior Japanese Patent Application No. 2006-046051, filed in Feb. 22, 2006, the entire contents of which are incorporated herein by reference.

BACKGROUND OF THE INVENTION

The present invention relates to a processor, and more specifically relates to a secure processor, which can prevent unauthorized code execution.

DESCRIPTION OF THE RELATED ART

With the increase in the use of computers and personal digital assistants in recent years, there is growing importance concerning the security of the programs executed in the equipment.

Equipment implementing processors can realize various functions by program execution by the processors, and it has higher flexibility of the operation and is easier to implement a large variety of functions, as compared to equipment comprising hardware alone. Because of such favorable characteristics, the processors are implemented in a variety of information equipment, such as various computers (e.g. personal computer), PDA (Personal Digital Assistant), cellular phones, and other information appliances.

With the advancement of networks, information equipment may be connected to a network, thereby increasing the opportunities of using the equipment to transmit/receive mails and data via the network or to download a program. For that reason, there is an increasing risk that the equipment may be infected with a computer virus or possibly exposed to unauthorized accesses.

In order to enhance the security of the information equipment with processors, it is necessary to prevent the processors from operating malevolent codes or undesired codes. However, at present, measures in the processor side to prevent the malevolent code operation are not sufficient, and a safe software implementation environment has not been provided.

A recent study of conventional secure processors has revealed some secure processors which disable directly reading data by applying encryption to data handled outside of the processor, and by applying access protection inside the processor. For example, data and instruction codes are encrypted and stored in a main storage device or a secondary storage device. When a processor executes an instruction, the encrypted instruction codes are decrypted and stored in cache memory in the processor before the execution of the instruction codes.

Among other such conventional secure processors, is a secure processor employing a virtual storage system. A processor employing the virtual storage system uses an Address Map Register (AMR) and a Translation Look-aside Buffer (TLB) as an address conversion method from a logical address (virtual address) to a physical address. An AMR is a register instructing the address conversion from an arbitrary address to an address with a certain size. A TLB is a register file instructing address conversion of a fixed size (in general, 4-16 kB (kilobytes)).

FIG. 1 is a pattern diagram describing a configuration of a TLB within a processor core of the conventional secure processor.

An entry of the TLB comprises each of the items of "valid", "permission", "Virtual Address (VA)" and "Physical Address (PA)". "Valid" is information indicating whether or not the entry is valid. "Permission" is information indicating whether or not the address conversion is permitted (non-readable etc.) VA is a virtual address (logical address) that is the target of the address conversion by the entry. PA is a physical address after address conversion of VA.

The conventional secure processor has a problem that speed of encryption processing is slow due to the circuit for encrypting the instruction code and data is external to the chip carrying the secure processor, therefore encryption performance is low.

Additionally, in the encryption process, the key used for the encryption is determined in the encryption processing circuit side on the external chip. Therefore it is independent from the types of instructions executed in the secure processor side, a distinction of operation modes (access modes) of the processor such as kernel modes, supervisor modes, and user modes, and/or a distinction of the access addresses of fetching of data and instruction codes. Further, the process unit on secure processor side cannot designate the key for encryption and decryption. For that reason, problems exit in selecting an appropriate key for an instruction in execution in a conventional secure processor.

Additionally, Japanese Patent Application Publication No. 2002-353960 discloses a system relating to the safety of a software implementation environment. For example, a code execution apparatus is disclosed that authenticates encrypted execution code, confirms the validity of the execution code, has a secure processor fetches an instruction corresponding to the encrypted execution code, and executes the instruction as a secure task.

However, in the disclosed code execution apparatus above, the process corresponding to the execution code does not have any connection with a key used for its authentication. Therefore, the problem of performing malevolent operations in the operation system (OS) and operating malevolent instruction codes when a key for authentication other than the original one is allocated to the program could not be solved.

It should also be noted that the applicant of the present application has previously devised a secure processor having the same objectives as the present invention, and filed the application with Japan Patent Office. The secure processor, published in Japanese Patent Application Publication No. 2006-18528, however, adopts a configuration different from the configuration of the present invention.

BRIEF SUMMARY OF THE INVENTION

It is a first object of the present invention to realize a secure processor that is based on storage contents of memory stored in a form such that an encrypted instruction code is not rewritable, authenticates in sequence instruction codes of a program stored in a secondary storage device, expands the extent of reliable application programs in stages, and is configured to execute reliable instruction codes only.

It is a second object of the present invention to improve the safety of the processing of the processor by authenticating the instruction codes and data of a program using an authentication key corresponding to the instruction codes and data at a time of storing the instruction codes and data for the processor, and by processing only the instruction codes and data succeeded in authentication by the processor.

It is a third object of the present invention to realize the first and the second objectives with a configuration that can be easily added to existing common processors.

The present invention assumes a secure processor that decrypts an encrypted instruction code and executes the instruction code.

A first aspect of the secure processor of the present invention comprises a processor core executing the instruction code obtained by decrypting the encrypted instruction code, a secure bus implemented in the position where the program executed by the processor core cannot access, and secure hardware connected to the secure bus, for performing authentication of the encrypted instruction code executed by the processor core and encryption/decryption of the encrypted instruction code and data that the processor core inputs from/outputs to the outside.

In the first aspect of the secure processor of the present invention, the secure hardware, by holding a key used for encryption/decryption of the encrypted instruction codes and data, in a process block connected via the secure bus, can place the key at a position where the program executed in the processor core cannot access, and can therefore guarantee the safety of the key.

A second aspect of the secure processor of the present invention is such that the secure hardware in the first aspect of the secure processor comprises a storage unit storing a built-in key, for example, and is initiated by a secure boot program encrypted by the built-in key. The secure boot program is configured such that it serves as a starting point of an instruction code authentication executed by the secure processor.

In the second aspect of the secure processor of the present invention, it is possible to maintain the reliability of the program executed in the processor core by having the secure boot program serve as a starting point of an instruction code authentication executed in the processor core. Additionally, reliability is maintained afterwards by continuing the instruction code authentication.

A third aspect of the secure processor of the present invention is such that in the second aspect of the secure processor the secure hardware comprises a secure pipe connected to the secure bus. This allows for performing encryption/decryption of the encrypted instruction code and data that the processor core inputs from/outputs to the outside.

In the third aspect the process for encryption/decryption of the encrypted instruction code and data that the processor core inputs from/outputs to the outside can be performed using a safety guaranteed key, by the secure pipe.

A fourth aspect of the secure processor of the present invention is such that in the second aspect of the secure processor, the secure hardware comprises a secure assist connected to the secure bus, for transmitting/receiving a command and information to/from a program executed in the processor core via a public interface, and for executing a public key system encryption process and a public key system authentication process.

The fourth aspect of the secure processor of the present invention enables the program to request for secure hardware process and to obtain information only via the public interface. This is implemented by the secure assist transmitting/receiving commands or information to/from the secure assist via the public interface from the program executed in the processor core.

A fifth aspect of the secure processor of the present invention is such that, in the second aspect of the secure processor, a configuration is made to comprise a secure DMA which has a DMA transfer function, for example, connected to the secure bus, for performing a page verification of an instruction code or data transferred by the DMA transfer function. Meanwhile DMA is Direct Memory Access.

In the fifth aspect of the secure processor of the present invention, page verification can be processed at high-speed by the secure DMA.

A sixth aspect of the secure processor of the present invention is such that in the second aspect of the secure processor, a configuration is made, for example, to comprise the secure pipe of the third aspect of the secure processor, the secure assist of the forth aspect of the secure processor, and the secure DMA of the fifth aspect of the secure processor. The secure assist has a configuration such that the setting/control of the secure pipe and the secure DMA is performed via the secure bus.

The sixth aspect of the secure processor carries out the functions comprised in the secure pipe of the third aspect of the secure processor, the secure assist of the forth embodiment of the secure processor and the secure DMA of the fifth embodiment of the secure processor, while guaranteeing the safety of the program executed in the processor core.

A seventh aspect of the secure processor of the present invention is such that in the sixth aspect of the secure processor, the secure pipe, for example, comprises an encryption key table having an entry where an encryption key license information of the encryption key and a first flag that indicates whether the encryption key is reliable or not are registered, and the entry corresponding one-to-one with TLB/AMR of the processor core. Additionally, the entry comprises a TLB/AMR expansion unit for registering identification information of the encryption key registered in the encryption key table, and a second flag that is a copy of the first flag registered in the entry of the encryption key table designated by the encryption key identification information and license information. Furthermore, the entry comprises a license check unit for examining whether or not the license information registered in the entry of the TLB/AMR expansion unit matches the license information registered in the entry of the encryption key table designated by the encryption key identification information registered in the entry of the TLB/AMR expansion unit.

In the seventh aspect, by checking whether or not the license information registered in the entry of the TLB/AMR expansion unit matches the license information registered in the entry of the encryption key table designated by the encryption key identification information registered in the entry of the TLB/AMR expansion unit, the access to the data space regulated by the address space information stored in the entry of TLB/AMR of the processor core can be restricted to programs having valid access authority to the data space.

The eighth aspect of the secure processor of the present invention is such that in the seventh aspect, for example, the entry of TLB/AMR of the processor core comprises a third flag having the same function as the second flag of the TLB/AMR expansion unit.

In the eighth aspect, it is possible to speed up the process relating to the security of the data space of the above seventh embodiment secure processor by using a third flag in the entry of TLB/AMR of the processor core.

A ninth aspect of the secure processor of the present invention is such that in the sixth aspect, for example, a configuration is made such that the secure hardware comprises a key authentication unit for authenticating a public-key encrypted key of an instruction code. Additionally, the configuration comprises a license information generation unit for generating license information of the public-key encrypted key when the public-key encrypted key is authenticated by the key authentication unit. Furthermore, the ninth aspect comprises a key decryption unit for decrypting the public-key encrypted key when the public-key encrypted key is authenticated by the key authentication unit, and license information generated by the license information generation unit that is stored by a program during execution of the processor core that requested authentication to the authentication unit, and the key decrypted by the key decryption unit is registered to the encryption key table.

In the ninth aspect of the secure processor of the present invention, for the program executed in the processor core, the key operation such as key registration and key removal to/from the entry of the encryption key table is restricted to the program holding the license information alone.

A tenth aspect of the secure processor of the present invention is such that in the sixth aspect, for example, a configuration is made such that the secure hardware comprises a key authentication unit for authenticating a public-key encrypted key of an instruction code, a page verification unit for verifying the instruction code in units of pages, a license information generation unit for generating license information of the public-key encrypted key when the public-key encrypted key is authenticated by the key authentication unit and a page of the instruction code is verified by the page verification unit, and a key decryption unit for decrypting the public-key encrypted key when the public-key encrypted key is authenticated by the key authentication unit and a page of the instruction code is verified by the page verification unit, and license information generated by the license information generation unit is stored by a program during execution in the processor core that requested authentication to the authentication unit, and the key decrypted by the key decryption unit is registered to the encryption key table.

In the tenth aspect of the secure processor of the present invention can prevent unauthorized key operation to the entry of the encryption key table by the program with a falsified instruction code in addition to the function of the above ninth aspect of the secure processor.

According to the present invention, it is possible to realize a secure processor that is based on storage contents of memory stored in a form that an encrypted instruction code is not rewritable, authenticates in sequence instruction codes of a program stored in a secondary storage device, expands the extent of reliable application programs in stages, and is able to execute reliable instruction codes. According to the present invention it is also possible to improve the safety of the process of the processor by authenticating the instruction codes and data of a program using an authentication key corresponding to the instruction codes and data at a timing to store the instruction codes and data to the processor, and by only processing the instruction codes and data successful in the authentication by the processor.

The present invention enables one to realize a secure processor having the above effects with a configuration that can be easily added to common processors.

BRIEF DESCRIPTION OF THE DRAWINGS

FIG. 3A shows an operation flow (boot sequence) of a program in system boot of the secure processor of the present embodiment.

FIG. 3B shows a mapping state on memory of the program.

FIG. 3C is a pattern diagram showing setting state of the TLB/AMR of the processor core and the TLB/AMR expansion unit of the secure pipe 60 corresponding to the above operation flow.

FIG. 4A is a diagram showing a method of code authentication in the authentication mode 1.

FIG. 4B is a diagram showing a method of code authentication in the authentication mode 2.

FIG. 4D is a diagram showing a flow of the code authentication process in the authentication mode 1.

FIG. 5B is a diagram showing the relation of access controls by the S-bit.

FIG. 6 is a diagram showing an outline of the child program authentication procedure performed by the S=1 parent program in the secure processor of the present embodiment.

FIG. 7 is a diagram showing an example of the configuration of the encryption key table provided in the secure pipe.

FIG. 8 is a diagram describing the configuration of the TLB/AMR expansion unit provided in the secure pipe.

FIG. 11A is a pattern diagram showing the operation outline of the secure hardware in the key generation process.

FIG. 12A is a block diagram showing a hardware mechanism for performing the key storage process of the secure processor of the present embodiment.

FIG. 18 is a diagram showing the operation of the secure pipe when the program executed in the processor core issues data/instruction read command.

DETAILED DESCRIPTION OF THE INVENTION

In the following description, details of the present invention's embodiments are set forth with reference to the drawings.

[Entire Configuration]

Figure 2:
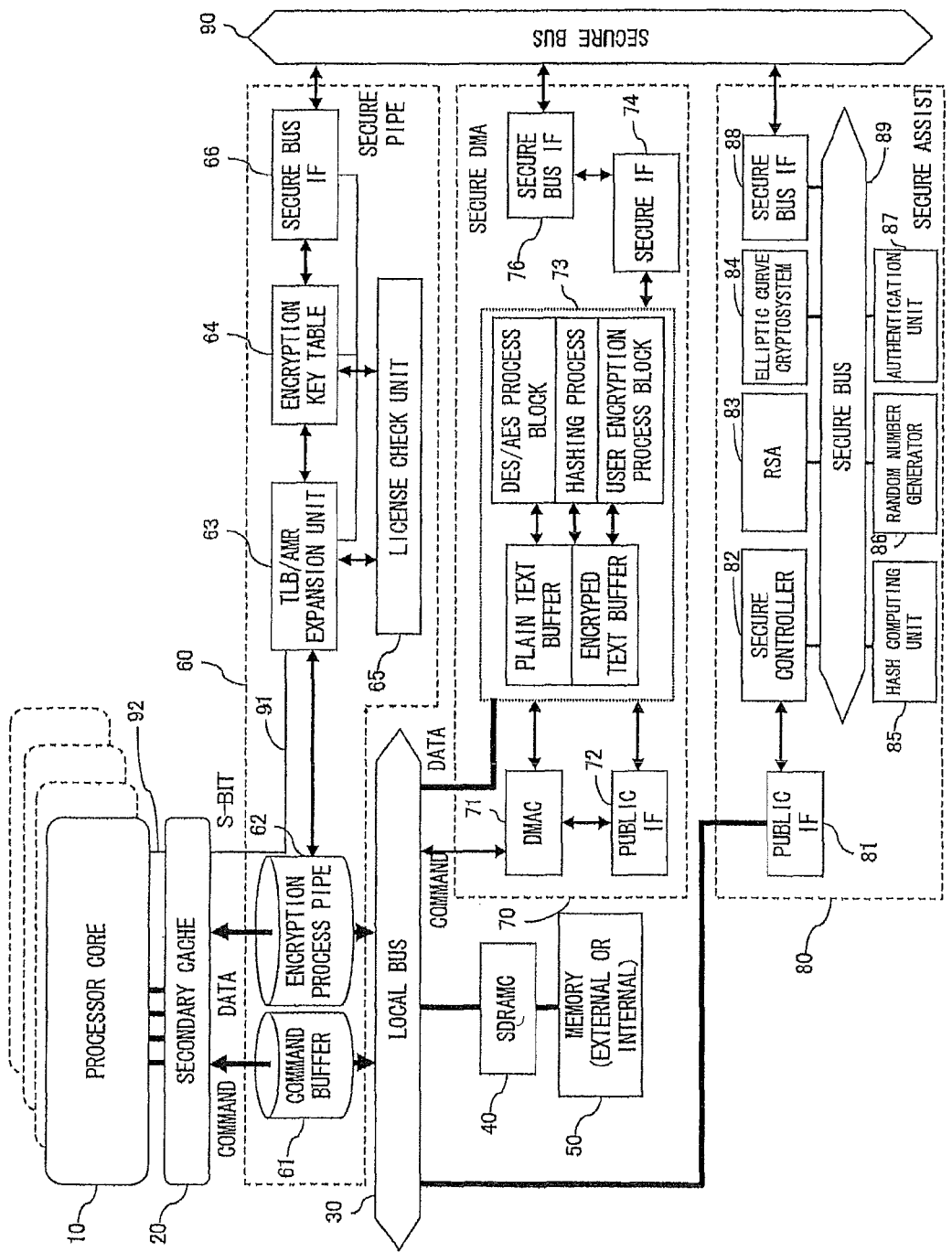
FIG. 2 is a diagram describing the configuration of the entire secure processor system that is an embodiment of the present invention.

FIG. 2 is a diagram describing the configuration of the entire secure processor system, which is an embodiment of the present invention.

The secure processor of the present embodiment shown in FIG. 2 comprises a processor core (central operating circuit) 10, secondary cache 20, a local bus 30, and a SDRAMC (Synchronous Dynamic RAM Controller) 40. Memory 50 is connected to SDRAMC 40. Memory 50 is implemented outside or inside of the secure processor.

The processor core 10 and the secondary cache 20 constitute a CPU core. In addition to the above components of the existing processor, the secure processor of the present embodiment is further comprised of three blocks of a secure pipe 60, secure DMA 70, and a secure assist 80. In the present embodiment, all of these three blocks are referred to as secure blocks.

The three blocks are connected to each other via the secure bus (first secure bus) 90. Software operating in the processor core 10 cannot recognize the secure bus 90. The memory processor 50 is implemented in the same chip as the processor core 10 or outside of the chip. It should be noted that the number of the processor core 10 is not limited to one but a plurality of processor cores can be implemented. More than one CPU core can be also implemented.

The secure pipe 60 is between the secondary caches 20 and the local bus 30. It is comprised of a command buffer 61, an encryption process pipe 62, a TLB/AMR expansion unit 63, a key table 64, a license check unit 65, and a secure bus IF (secure bus interface) 66.

The encryption process pipe 62, provided between the secondary cache 20 and the local bus 30, performs encryption and decryption between the processor core 10 that processes unencrypted plain text and the external equipment that handles encrypted data. The encryption process pipe 62 performs encryption and decryption by employing common key cryptosystem represented by DES and AES, for example.

The command buffer 61 is comprised of a function for absorbing data delay caused by the encryption process in the encryption process pipe in the secure pipe. The software (program) executed in the processor core 10 sends commands and a variety of information to the secure DMA 70 and the secure assist 80 via the command buffer 61. The software executed in the processor core 10 reads the content of each register, which is implemented in the public IF of the secure assist 80, via the command buffer 61. The command buffer 61 is a channel for commands issued from the processor core 10.

In the present embodiment, the commands are issued by register read/write access performed to the secure assist 80, and therefore, the command buffer itself does not have the security function. In the present embodiment, the register read/write access of the secure assist 80 is realized by read/write of data targeting the secure assist 80's address, without providing a command dedicated to the secure assist 80. In other words, a command issue to the secure assist 80 is realized by a method equivalent to the publicly known "memory mapped I/O" method.

In the present embodiment, secure hardware is a section where the secure blocks and the secure bus 90 are integrated. But, in the present invention, only the secure block may be called the secure hardware. The secure hardware is a component in the secure processor of the present embodiment and is unique to the present invention. In the present embodiment's secure processor, the security of data can be maintained in the processor core 10's process as data is encrypted after passing through the secure pipe 60 by the encryption process pipe 62.

In the secure processors, an important issue is to maintain security of the key used for encryption. The secure processor of the present embodiment addresses this issue by encrypting the key rather than by handling the unchanged key and by decrypting the encrypted key using hardware.

The encrypted key table (key table) 64 is used for key management for each program and data space. The same number as the TLB/AMR in the processor core 10 of the TLB/AMR expansion unit 63 is implemented. The TLB/AMR expansion unit 63 comprises a function for logically associating the key stored in the encrypted key table 64 with a physical page of the memory 50. The TLB/AMR in the processor core 10 is provided in an MMU (memory management unit), for example.

The license check unit 65 validates access to the secure pipe 60 and restricts any unauthorized access. The secure bus IF 66 is a bus interface used for receiving an instruction from the secure assist 80 via the secure bus 90 setting the secure pipe 60's process.

The secure DMA 70 is comprised of the DMAC (DMA Controller) 71 and the public IF (public interface) 72, and is further comprised of a common key cryptosystem process/hash process unit 73, a secure IF (secure interface) 74, and a secure bus IF (secure bus interface) 76.

The common key cryptosystem process/hash process unit 73 is comprised of a DES/AES process block, a hash process block, a user encryption process block, a plain text buffer and an encryption buffer. The common key cryptosystem process/hash process unit 73 performs common key cryptosystem process such as AES or DES and hashing operation relative to the transfer region of the secure DMA 70.

The secure IF 74 comprises a register to which commands and status relating to DMA, such as a DMA command and a DMA status, is set, and a register storing a DES encryption key, an AES encryption key, a plain text hashing value, and encrypted hashing value.

The secure bus IF 76 is an interface for receiving information relating to the key from the secure bus IF 66.

The secure DMA 70 is configured to be able to start a DMA with encryption process function via the public IF 72 in addition to the common DMA function. This is because the secure DMA 70 functions as an encryption process accelerator. The secure DMA 70 can perform the regular DMA process without encryption process through the DMAC 71 and the public IF 72 and has a configuration in consideration of maintaining the compatibility with the existing software.

The secure assist 80 is comprised of a public IF (register IF) 81, a secure controller 82, an RSA computing unit 83, an elliptic curve cryptosystem computing unit 84, a hashing operation unit 85, a random number generator 86, an authentication list 87, a secure bus IF 88, and a secure bus 89. It performs setting/control of the secure pipe 60 and the secure DMA 70 via the secure bus 90 as well as performing the computing process and the authentication process of the public key system. The secure controller 82 realizes the instruction for the secure pipe 60 or the secure DMA 70, such as combination operation and various actual settings, by a state machine process.

In the secure assist 80, the public IF 81 alone can be used among software operating in the processor core 10 and blocks other than the public IF 81 cannot be accessed.

The RSA computing unit 83 performs an RSA process by the hardware RSA key. The elliptic curve cryptosystem computing unit 84 performs an elliptic cryptosystem process using a hardware elliptic curve encryption key. The hashing operation unit 85 performs hashing operation for signature authentication etc. The random number generator 86 generates a random number for key generation and license information generation. The authentication list 87 stores a built-in key and an officially registered key, which is explained later. The secure bus IF 88 is an interface for transmitting the setting/functional control of the secure pipe 60 and the secure DMA 70 to the secure bus 90.

An S-bit signal line 91 connects the TLB/AMR expansion unit 63 in the secure pipe 60 and the secondary cache 20. The S-bit signal line 91 is employed for outputting the S-bit from the secure pipe 60 to the processor core 10, and the S-bit is output to the processor core 10 via a signal line 92 connecting the secondary cache 20 and the processor core 10. The S-bit signal lines also connect the secondary cache 20 and the secure DMA 70, and the secondary cache 20 and the secure controller 82, although they are not shown in the drawings. Details of the S-bit are explained later.

The secure processor of the present embodiment realizes encryption of commands and data, and protection of the key used for encryption using the configuration in which the secure pipe 60, the secure DMA 70, and the secure assist 80 are added to the existing processor.

[Boot Sequence for Maintaining Security of Keys]

FIGS. 3A-3C are diagrams explaining a boot sequence for maintaining security of keys in the secure processor of the present embodiment.

In the secure processor of the present embodiment, Address Map Register (AMR) and Translation Look-aside Buffer (TLB) are used as an address conversion method to convert a logical address (virtual address) in the virtual storage system to a physical address. AMR is a register instructing address conversion from an arbitrary address to addresses of a certain size. TLB is a register file instructing address conversion of a fixed size (4-16 kB (kilo byte) in general).

In the present embodiment, the TLB/AMR expansion unit 63 is added to AMR and TLB provided in MMU (Memory Management Unit) of the processor core 10, and the TLB/AMR expansion unit 63 is provided to the secure pipe 60. One of the features is that an encryption key is assigned to a space managed by the TLB/AMR expansion unit 63, and the secure pipe 60 encrypts the data input to/output from the space.

FIG. 3A shows an operation flow (boot sequence) of a program in system boot of the present embodiment's secure processor. FIG. 3B shows a mapping state on the program's memory, and FIG. 3C is a pattern diagram showing setting state of the processor core 10's TLB/AMR and the TLB/AMR expansion unit 63 of the secure pipe 60 corresponding to the above operation flow.

As shown in FIG. 3A, the boot sequence is roughly divided into (1) a process using a normal setup program, (2) a process using a secure program, and (3) a process using an OS (Operation System) and an application. These processes are performed in order of (1)-(3).

TLB and AMR are not validated immediately after the start of the secure processor. For that reason, the encryption function is also invalid. In such a state, the normal setup program performs a normal initialization process like the conventional processors (S1).

Next, the normal setup program copies an encrypted program called a secure boot program, which is stored in the secondary storage device etc., to the memory 50 (S2). A built-in key embedded in the secure processor as hardware encrypts the secure boot program. The built-in key is supplied from a manufacturer of the secure processor. In the present embodiment, the built-in key, as shown in FIG. 3C, is associated with the TLB/AMR expansion unit 63 corresponding to an AMR-0 of the processor core 10. The built-in key is configured to become effective upon setting the address conversion information of the AMR-0. As described above, the present embodiment associates the built-in key with the AMR-0; however, another configuration in which the built-in key is associated with TLB is also possible.

Following step S2, address conversion information is set to the AMR-0 causing the secure boot processor to be usable (S3). At this point in time, the built-in key is validated.

The secure boot program's setting is terminated after the processes in the above steps S1-S3. In other words, the setting is terminated after copying the secure boot program and validating the built-in key.

The secure boot program may be provided from outside the secure processor or may be embedded in the hardware as a microcode. Either method can be employed without any problem.

The secure boot program, afterwards, becomes the starting point of code authentication, and software reliability and system reliability executed in the secure processor are maintained by continued authentication.

(B) Activation of the secure boot program shown in FIG. 3B is executed by dividing after termination of the setting of (A) the secure boot program. The secure boot program is the first authentication program (a program S=1) after booting the secure processor, and enables initialization of the secure hardware (the secure pipe 60, the secure DMA 70, and the secure assist 80) of the present embodiment. For that reason, the secure boot program authenticates the user application's core program (assume the program is referred to as "kernel" in the following description). Details of the authentication are explained below.

As shown in FIG. 3B, the secure boot program executes the kernel authentication process and the control is moved to the kernel. The kernel space is set to the AMR-1 as shown in FIG. 3C. When the kernel is authenticated, a kernel key is assigned to the kernel. The kernel key is associated with the TLB/AMR expansion unit 63 corresponding to the AMR-1. The kernel key is maintained until the kernel is stopped.

The processes after the secure boot program's activation are set forth with reference to FIG. 3A. The secure boot program initializes the secure hardware (S4), and authenticates kernel key information (S5). Afterwards, the authenticated kernel is copied to the memory 50 based on the address conversion information of the AMR-1, and the control is moved to the kernel (S6).

As described above, the secure boot program performs the kernel authentication process. When control is moved to the kernel, the space occupied by the secure boot program is released, thus terminating the process.

The kernel authenticated by the secure boot program further authenticates its child program (secure application) and assigns logical space to the child program. Then, the child program is started.

Details of the above process are explained with reference to FIG. 3A.

The kernel started by the secure boot program generates own data space after the initialization (S7). The kernel authenticates its child program (secure application) and starts the authenticated secure application (8). At that point in time, the kernel indicates encryption key of the secure application to the secure hardware. The secure boot program's space is then released in the memory 50, as shown in FIG. 3B. The built-in key is invalidated, as shown in FIG. 3C, and is deleted. After the deletion of the built-in key, the TLB/AMR expansion unit 63 corresponding to the AMR-0 becomes unset.

An encryption key (application key) is assigned to the child program (secure application) authenticated by the kernel using the secure hardware. The application key is associated with the TLB/AMR expansion unit 63 corresponding to the TLB entry (an entry to which address conversion information of the secure application is set) of the processor core 10.

A child program without authentication information (non-secure application) can also be executed in the secure processor of the present embodiment, although there are some restrictions. Encryption keys are not assigned to non-secure applications (NS applications) and therefore, the region of the TLB/AMR expansion unit 63 for the TLB entry, to which the address conversion information of the NS application is set, becomes unset (see FIG. 3C).

In the present embodiment, a state that a program is in execution in the authenticated space is referred to as "S-bit is set". Here, unlike the supervisor mode of the UNIX, the S-bit does not have the inheritance property; however, the S-bit indicates whether the code currently being executed is reliable (authorized) or not.

[Code Authentication Method]

The code authentication method in the present embodiment is set forth with reference to FIGS. 4A, 4B, 4C, 4D and 4E.

The code authentication is executed in the secure boot program and in the kernel (the core program of the user application) authenticated by the secure boot program etc., as shown in the boot sequence of FIG. 3.

In the present embodiment, authentication mode 1 and an authentication mode 2 are employed as the code authentication mode. The authentication mode 1 performs common key encryption assuming a program a single authentication unit.

[Authentication Mode 1]

The authentication mode 1 is explained with reference to FIG. 4A.

The authentication mode 1 performs code authentication by the following functions of (1)-(4).

(1) Encryption of protection target code
(2) Signature on the code encryption key
(3) Verification of signature on the encryption key
(4) Security error conditions (S-bit+invalid instructions)

As shown in FIG. 4A, in the authentication mode 1, an encryption key $K_s1$ necessary for encryption process, is provided in such a way that it is encrypted by a public key $K_{px}1$. Key signature 102 is provided to the public-key encrypted encryption key $K_s1$ (encrypted key $K_s1$). The signature verification process for the encrypted key $K_s1$ is performed using the key signature 102, a signature verification key 103 provided separately, and a signature 104 to the signature verification key (signature verification key signature).

In FIG. 4A, verification by an RSA public key is performed; however, verification by another method such as an HMAC key would not cause problems and can be employed.

The authentication mode 1 is a method where the verification of the encryption key is considered as the code verification. Because invalid codes cannot be decrypted normally, thus preventing particular invalid executions, security can be achieved.

Details of the above code authentication process are set forth with reference to FIGS. 4C and 4D.

Figure 4C:
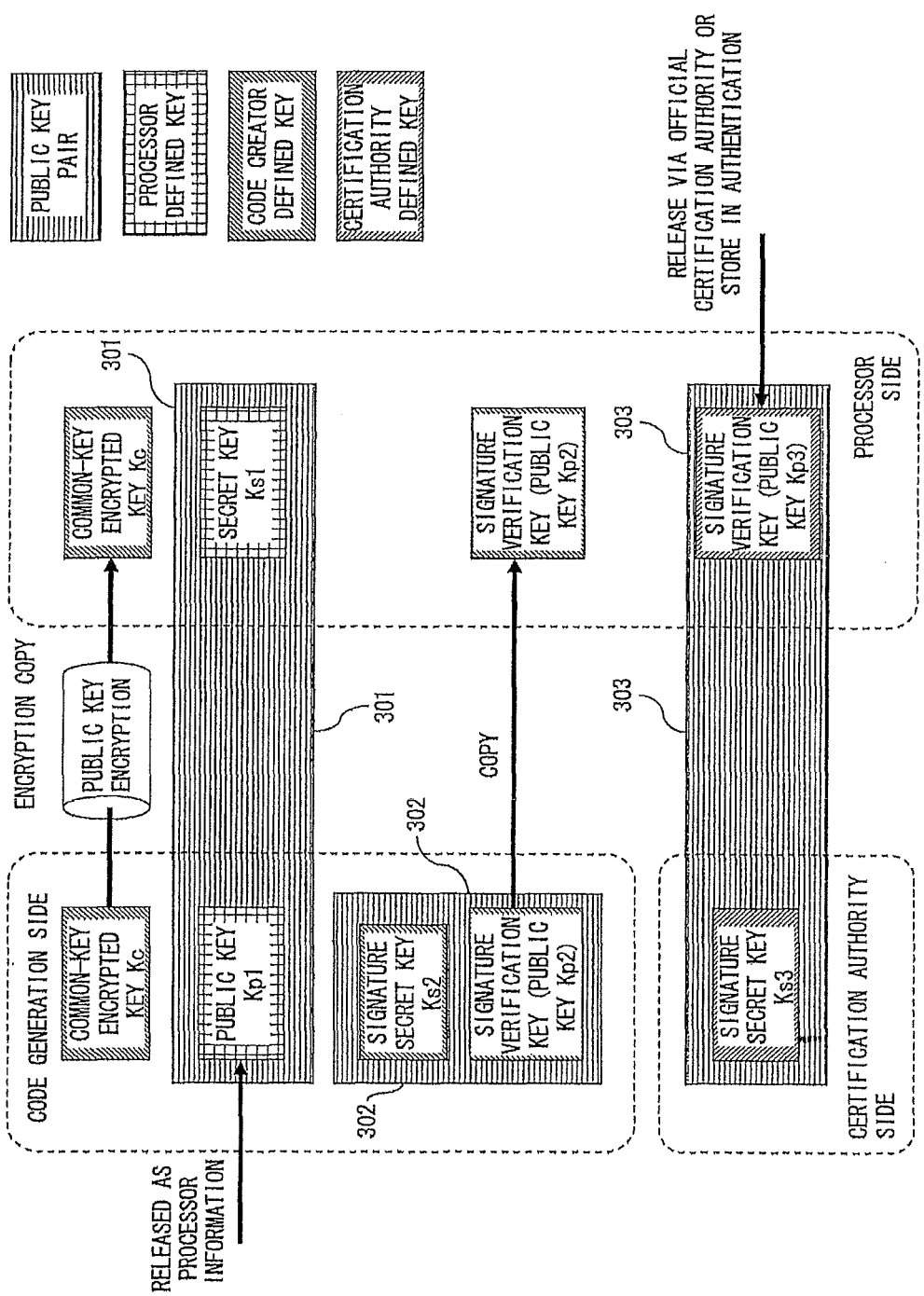
FIG. 4C is a diagram showing information required in the code authentication of the authentication mode 1.

FIG. 4C indicates information required for the code authentication in the authentication mode 1, and FIG. 4D indicates the flow of the code authentication process.

FIG. 4C indicates a combination of a key held in the hardware or the software of the secure processor and a key used for instruction code generation (a key used when generating an object, for example). As shown in FIG. 4C, a common key $K_c$, a first public key pair 301 (a public key $K_p1$ and a secret key $K_s1$), a second public key pair 302 (a signature verification key (public key $K_p2$) and a signature secret key $K_s2$), and a third public key pair 303 (a signature secret key $K_s3$ and a signature verification key (a public key $K_p3$)) are used for the code authentication.

The public key $K_p1$ and the secret key $K_s1$ form one pair, and the secure processor maintains the secret key $K_s1$ in a location (secure hardware) where software cannot read out the key. On the other hand, the public key $K_p1$ can be read by software executed in the secure processor via a register and is released as processor information. Thus, the code generating side can also use the key.

The code generating side stores the second public key pair 302 (the public key $K_p2$ and the secret key $K_s2$) required for signature verification, and presents the code exclusive signature verification key $K_p2$ to the secure processor as well as the encrypted code. The signature secret key $K_s3$ in the third public key pair 303 (the signature secret key $K_s3$ and the signature verification key $K_p3$), which is an officially certified key of the code generating side, is stored in a certification authority, and therefore, the key is not used in the secure processor side. The signature verification key $K_p3$ is released via official certification authority, and is stored in an authentication list 87 in the secure assist 80 from outside the secure processor via a network, for example through transmission, or as a hardware fixed value.

A method for delivery of the above keys among the mode generating side, the certification authority and the secure processor, and the authentication process procedure of the instruction code using the keys are explained with reference to FIG. 4D.

{Code Generating Process}

The code generating process performed by a code creator shown in the upper left of FIG. 4D is explained. The code generating process does not require the use of dedicated hardware, but can be implemented using methods such as software when generating an object (program).

(1) First, an instruction code 311 to be encrypted and authenticated and the common key $K_c$ are prepared. The instruction code 311 is encrypted with the common key $K_c$, and a common key encrypted instruction code 312 is generated (a common key encryption process).

(2) At the same time, the common key $K_c$ is encrypted using the public key $K_p1$ released from the secure processor, and the public key encrypted common key $K_c$ is generated (a public key encryption process 1).

As above, there are two types of information required to encrypt instruction code, the common key K, and the public key $K_p1$. Simply implementing these two keys can encrypt the instruction.

In addition, a process for generating information for authenticating that the above encryption was properly performed is executed.

(3) A hashing operation is performed to the common key $K_c$ encrypted by the above public key $K_p1$, and generates original data of the key signature (a hashing process 1).

(4) The original data is encrypted with the signature secret key $K_s2$, and the value obtained by the encryption serves as key signature S1 (a public key encryption process 2).

(5) The public key $K_p2$ in the above public key $K_p2$ pair serves as the signature verification key, and an electrical certification 313 is prepared, comprising the signature verification key signature S2 for authenticating the validity of data 314 comprising the signature verification key (a public key $K_p2$) and other information. The signature verification key signature S2 is received from the certification authority.

Four types of information, the common key encrypted instruction code 312, the common key encrypted common key $K_c$, the key signature S1, and the electrical certification 313, are provided to the secure processor via storage medium such as ROM, or transmission means 320 such as a network.

{Process in the Secure Processor}

A process where the secure processor decrypts and executes the encrypted instruction code is set forth with reference to "process in processor" on the right of FIG. 4D.

(1) The secure processor decrypts the public key encrypted common key $K_c$ received from the code creator by the secret key $K_s1$ (Public key decryption process 1).

(2) The hashing operation, which is the same as applied in the code creator side, is applied to the above public key encrypted common key $K_c$.

(3) The key signature S1 received from the code creator is decrypted with the signature verification key (public key $K_p2$) in the electrical certification 313 (Public key decryption process 2).

(4) The result obtained in the hashing process 1 is compared with the result obtained in the public key decryption process 2, and whether or not the results match, in other words, whether or not the encrypted key (common key $K_c$) is falsified, is determined. If the results match, the encrypted key is not falsified (key authentication).

(5) The hashing operation is applied to the data 314 (the signature verification key (public key $K_p2$) and other information) in the electrical certification 313 (hashing process 2).

(6) The signature verification key signature S2 in the electrical certification 313 is decrypted with the signature verification key (public key $K_p3$) (Public key decryption process 3).

(7) The result obtained in the above hashing process 2 is compared with the result obtained in the above public key decryption process 3, and whether or not the results match. In other words, it is determined whether or not the electrical certification 313 was created by a legitimate right holder (verification of the electrical certification).

(8) The comparison result in (4) (comparison result output 1) is compared with the comparison result in (7) (comparison result output 2), and if both of the comparison results show "match", the common key encrypted instruction code 312 is decrypted using the common key $K_c$ obtained in (1) (common key decryption process).

As described above, in the present embodiment, the instruction code is verified if it is correctly encrypted and is not falsified through the key authentication and the verification of the electrical certification. Only the instruction code that is correctly encrypted and is not falsified is decrypted. Consequently, execution of the validated instruction code by the secure processor is ensured.

{Certification Authority Process}

A process where the certification authority generates the signature verification key signature S2 for the electrical certification 313 of the encrypted instruction code created by a code creator is explained with reference to the "certification authority process" on the lower left of FIG. 4D.

The hashing operation is applied to the data 314 comprising the signature verification key (public key $K_p2$) and other information (hashing process 2)). Public key encryption process is performed to the operation result using the signature secret key $K_s3$, and the signature verification key signature S2 is generated (public key encryption process 3).

The above signature verification key signature S2 is provided to the code creator by using storage medium or a network.

The code creator generates the electrical certification 313 by using the signature verification key signature S2 received from the certification authority.

The certification authority process needs to be implemented only once before the use of the public key pair (the public key $K_p2$ and the secret key $K_s2$). The hashing operation is performed by HMAC, for example, and the public key operation is performed by a method such as RSA. The present invention does not particularly specify the methods for the hashing operation or the public key operation.

[Authentication Mode]

In the following description, the authentication mode 2 is set forth with reference to FIG. 4B.

The authentication mode 2 is comprised of the following functions (1)-(4).

(1) Encryption of the protection target code
(2) Signature on code encrypted key (encrypted key) and page hash
(3) Signature verification of encrypted key and page signature
(4) Security error conditions (S-bit request+invalid instructions)

The authentication mode 2 verifies the instruction code in units of pages. The verification in units of pages is performed in such a manner that the secure assist 80 starts the secure DMA 70 via the secure bus 90, and the secure DMA 70 performs hashing operation, and the operation result is verified. By the above manner, page verification is performed in the authentication mode 2, and failure of the verification is determined as authentication error, enabling detection of code falsification. Consequently, an authentication mode, which is a further enforced protection system than the authentication mode 1, can be realized.

In the authentication mode 2 of the present embodiment, if the program is large and the program is divided into a plurality of pages, all page keys (encrypted keys) are made identical, and the page signature verification is preformed in units of pages. It is possible to have a configuration such that each page has a distinct key.

As shown in FIG. 4B, in the authentication mode 2, the signature verification key process is performed using a page signature 105 in addition to the public-key encrypted public key $K_p2$, the key signature 102, the signature verification key 103, and the signature verification key signature 104. The page signature 105 is a signature for the page encrypted by the public key $K_p2$. In FIG. 4B, the page signature 105 is generated for each page of pages 1-3.

Figure 4E:
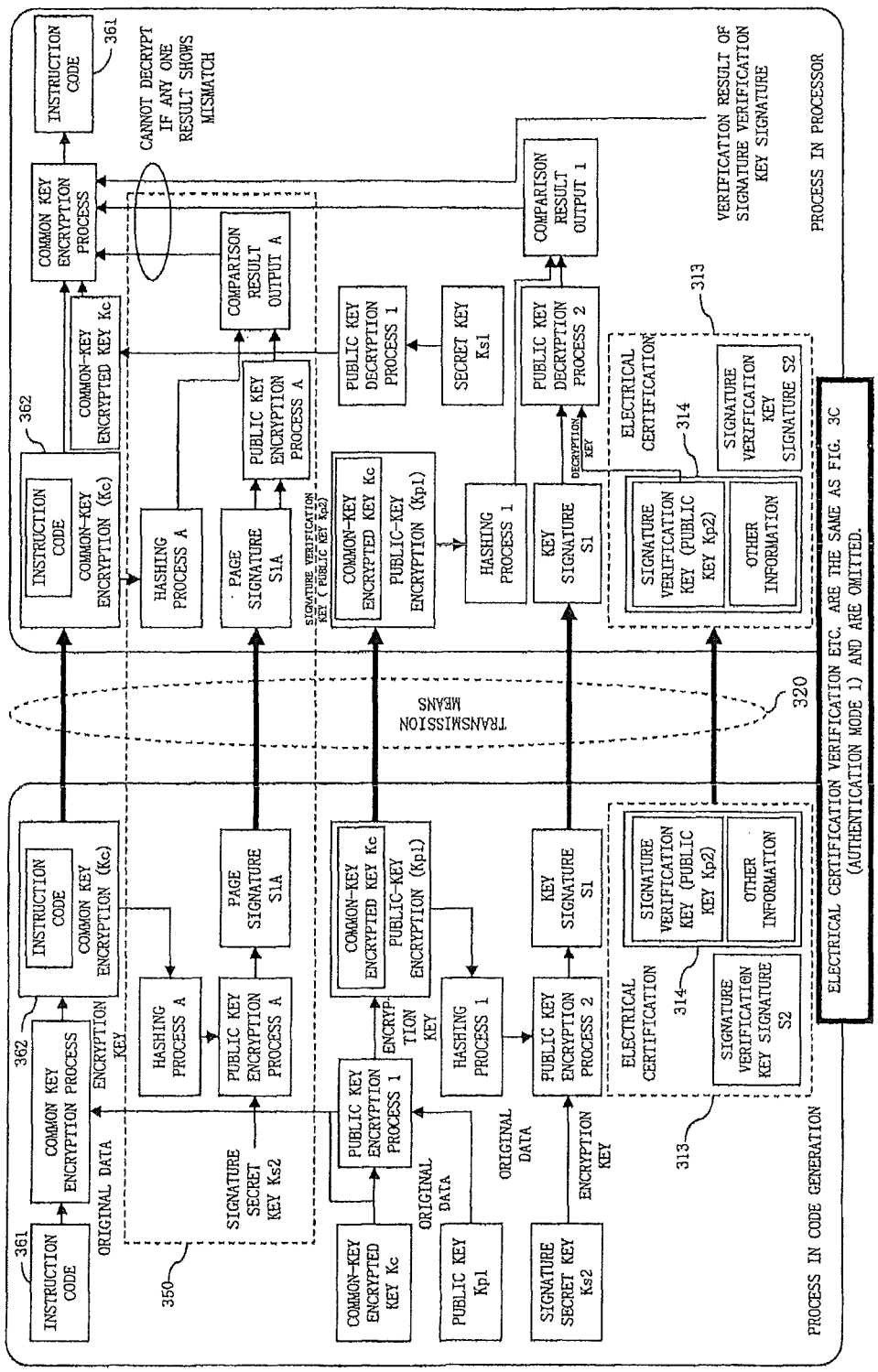
FIG. 4E is a diagram explaining key delivery and authentication process in the authentication mode 2.

FIG. 4E is a diagram explaining key delivery and authentication process in the authentication mode 2.

In FIG. 4E, a section surrounded by a dashed line rectangular frame 350 is a process added to the processes in the authentication mode 1 of FIG. 4D. In the authentication mode 2, in addition to the key authentication in the authentication mode 1, page signature for each authentication unit and verification are performed. When explained in greater detail, in the authentication mode 2, the hashing operation is performed for each page encrypted by the common key $K_c$ (hashing process A)) The operation result is encrypted with the signature secret key $K_s2$ (public key encryption process A) and a page signature S1A is generated. For multiple page signature, the key signature is generated in the same number as the page number. For example, for 3-page signature, in addition to page signature S1A, a page signature S1B and a page signature S1C are generated. In the authentication mode 2, the authentication of encrypted key and page authentication are performed simultaneously. Therefore, security can be achieved by stopping the process before the execution of the falsified pages.

Verification of the key signature S1A in the secure processor side is performed in the same mechanism as the verification of the key signature S1 shown in FIG. 4D. In other words, the common-key encrypted instruction code 362 is applied with the hashing operation (hashing process A) as well as decryption of the received key signature S1A using the signature verification key (the public key $K_p2$) (public key decryption process A). The result obtained in the hashing process A is compared with the result obtained in the public key decryption process A, and the result of the comparison is output (comparison result output A). In the authentication mode 2, in addition to the verification result of the comparison result output 1 and the authentication result of the signature verification key signature S2, the verification result of the above comparison result output A is examined. The common-key encrypted instruction code 362 is decrypted with the common key $K_c$ only when all of the above verification results and authentication result are correct (common key encryption process).

Detailed operation flows of the authentication mode 1 of FIG. 4D and the authentication mode 2 of FIG. 4E are explained below.

[Control by S-Bit]

The S-bit indicates whether or not the encryption key of the program being executed is authenticated by any method, such as the methods shown in FIG. 4D and FIG. 4E. The S-bit depends only on information of TLB/AMR relating to space where the program is in execution, and is independent of who started the program. Also S-bit is not the one comprised as a state as in the supervisor mode.

The S-bit are bits indicating the attribute of "authenticated". S-bit is added to the authenticated or generated keys, and is copied to TLB by associating the key with the program when the program is registered in TLB. The data protection (a certification that the program is not falsified when the program is to be executed normally) by the S-bit can be realized using a combination of the S-bit attribute of the program being executed and the data space's S-bit attribute.

The initial information S=1 is generated and registered by reading the above secure boot program. The program in which S=1 information is registered can generate S=1 space by the registration of an authenticated key.

Figure 5A:
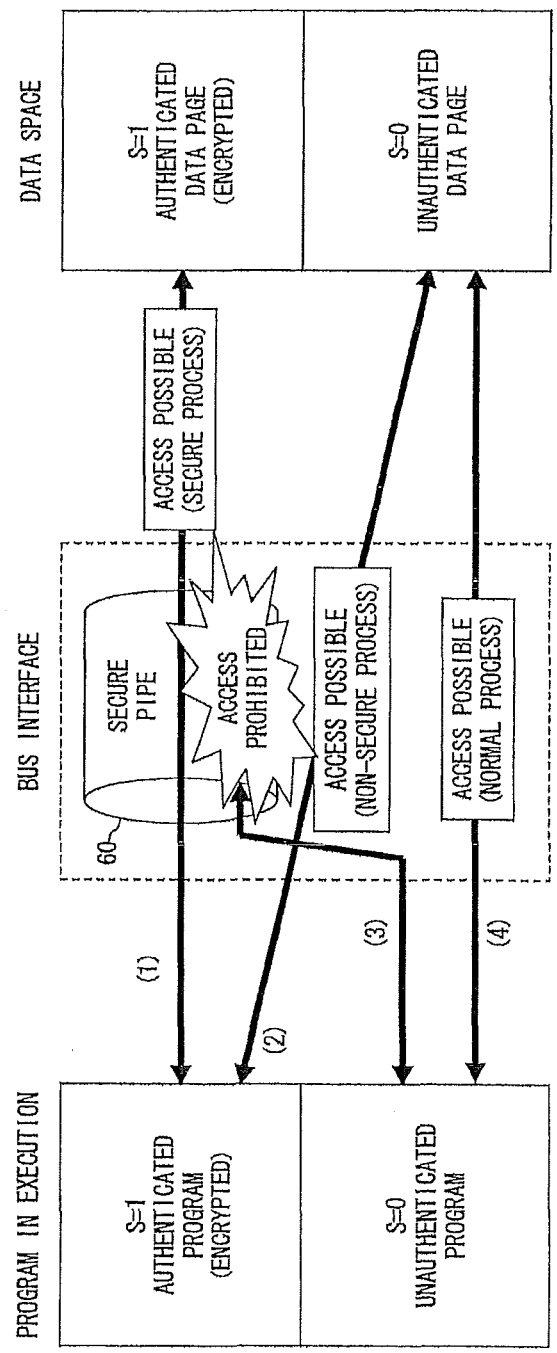
FIG. 5A is a diagram explaining access restriction control of the program by the S-bit attribute in the secure processor of the present embodiment.
Figure 5C:
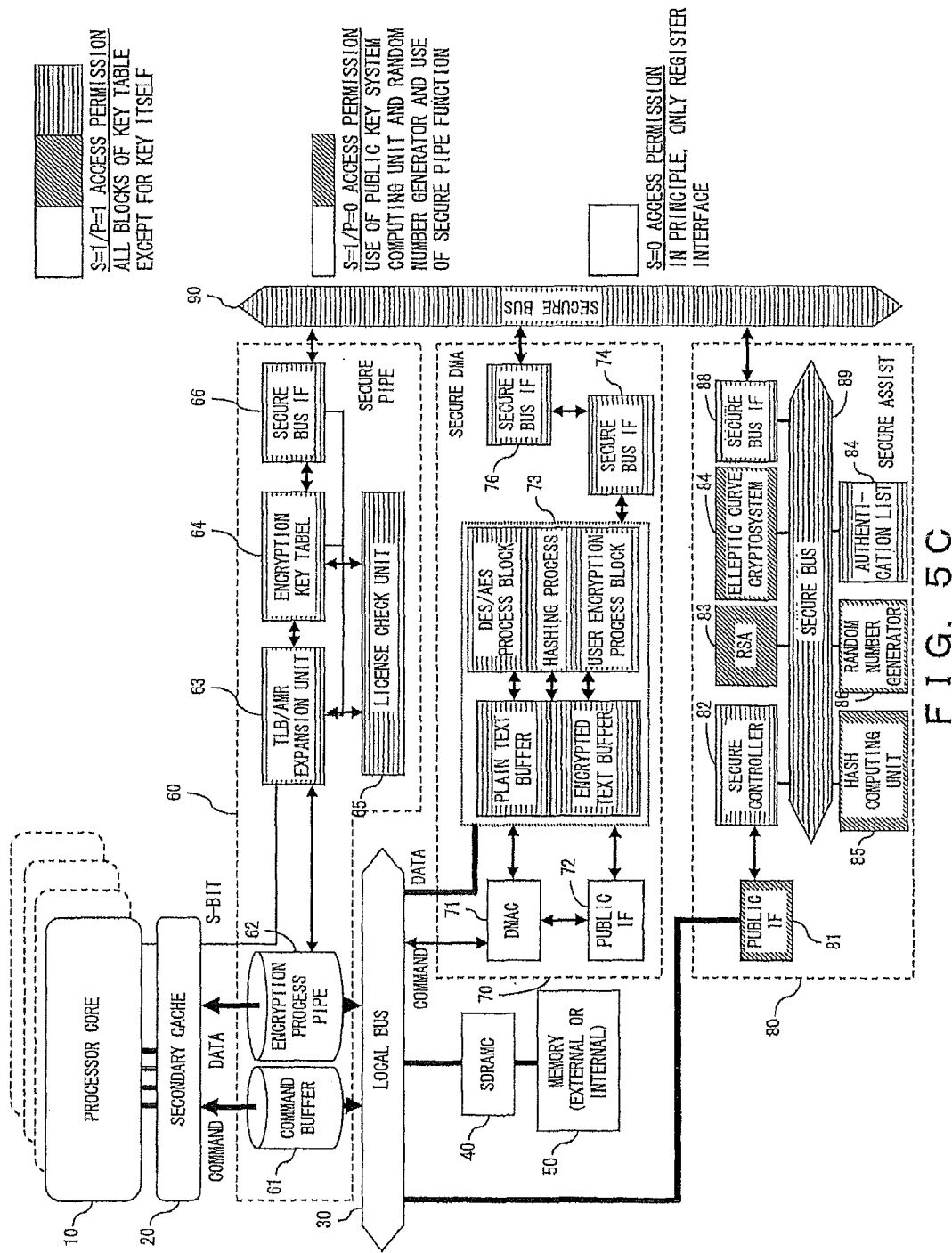
FIG. 5C is a diagram showing access restriction by the S-bit in the secure processor of the present embodiment.

An example of access control by the S-bit is shown in FIGS. 5A, 5B and 5C.

In the basic operation of the secure processor, the space where the authenticated program is present and the data space generated by the authenticated program are the only S=1 spaces.

FIG. 5A explains the program access restriction control by the S-bit attribute in the secure processor of the present embodiment.

When accessing S=1 data space (authenticated and encrypted data page) from the S=1 authenticated program (encrypted program), access via the secure pipe 60 is possible (secure process). Access from the S=1 program to the S=0 data space is possible without passing the secure pipe 60; however, the security is not ensured regarding the S=0 data space (non-secure process).

Access from the S=0 program (program without authentication) to the S=1 data space is prohibited. Access from the S=0 program to the S=0 data space is possible (normal process). The relation of access controls by the S-bit is shown in FIG. 5B.

FIG. 5C shows hardware access restriction by the S-bit in the secure processor of the present embodiment.

The program executed by the secure processor is classified into S=1 programs and S=0 programs, and is further classified to programs executed in a privilege mode (P=1) and non-privilege mode (P=0).

A program, which is classified as S=1 and P=1, can have access to all blocks of the secure processor although indirect accesses via the secure controller 82 are included. However, access is prohibited to retrieve the key stored in the key table 64.

The program classified into S=1 and P=0 can access all blocks except for gray blocks in the secure pipe 60, the secure DMA 70, and the secure assist 80. In other words, the public key system computing unit (the RSA computing unit 83, the elliptic curve cryptosystem computing unit 84, and the hashing operation unit 85) and the random number generator 86 can be used. The command buffer 61 and the encryption process pipe 62 can also be used.

The program classified in S=0 can use only DMAC 71 of the secure DMA 70 and the public IF 72. The rest of the clock cannot be used.

FIG. 6 is a diagram showing an outline of the child program authentication procedure performed by the S=1 parent program in the secure processor of the present embodiment. In FIG. 6, the process using hardware is indicated in a solid line, and the process using software is indicated in a dashed line.

The S=1 parent program is an authenticated program such as the secure boot program of FIG. 3. The authenticated program, such as the secure boot program, is hereinafter referred to as a parent program for simplicity. The child program to be authenticated by the parent program is provided together with the code encrypted by the common-key encryption system, as well as the encryption key used in the encryption of the code and encrypted by the public key, the key signature, the signature verification key, and the signature verification key signature (see FIG. 4A(a)).

As shown in FIG. 6, the child program code is common-key encrypted by a child program key. In FIG. 6, among a plurality of authentication information used for authenticating the child program by the parent program, a public-key encrypted child program key 411 alone is described (see a dashed line rectangular frame 410).

A secret key (hardware secret key), which makes a pair with the public key for the above public-key encryption, is stored in the authentication list 87 of the secure assist 80 of the secure processor, and cannot be read from the software executed in the secure processor.

Next, the child program authentication process procedure executed by the parent program is explained.

(1) The parent program sets the authentication information of a child program to be executed to the secure assist 80. In this procedure, the child program key is authenticated using the secure hardware by setting a public-key encrypted child program key 411 (common key) of the child program and authentication information not shown in drawings to the public key operation unit (the RSA computing unit 83 or the elliptic curve cryptosystem computing unit 84) via the public IF 81. Since software cannot intervene in the authentication process itself, the credibility of the authentication process can be ensured.

As for information to be set to the secure assist 80, there are "key attribute (encryption systems, key length, designation of block length)", and authentication information of "key signature" "signature verification key" "signature verification key signature", and "encryption key for public key encryption". Further, an entry number of the key table (encryption key table) 64, in which the authenticated key information is stored, is also information to be set to the secure assist 80. These are stored in a register implemented in the register interface in the public IF 81 of the secure assist 80.

After the parent program sets the above information at the public IF 81 of the secure assist 80, the secure hardware begins the hardware key authentication process by setting "key authentication command" to the command register in the public IF 81 of the secure assist 80. While the hardware key authentication process is executed, the parent program is in process termination wait state. When the hardware authentication process authenticates the child program, the encryption key table 64 is updated, and "key ID", "license information", and "child program key" are set to the relevant entry of the encryption key table 64. In the present embodiment, the software manages the empty entries of the encryption key table 64.

When the above hardware key authentication process is terminated, the secure assist 80 notifies the parent program of the key authentication termination by an interruption.

(2) The parent program reads the key authentication's status information from the public IF 81 of the secure assist 80 and determines whether or not the child program key is authenticated. When it is determined that the child program is authenticated, the parent program obtains the license information of the child program key stored in the encryption key table 64 via the public IF 81 of the secure assist 80 and stores the information in a prescribed storage area (software save).

In the present embodiment, to ensure the reliability, software cannot have access to the key stored in the encryption key table 64; however, software can use license information as alternative key information for alternative access permission to the key. The software can perform various processes by using the license information.

The registration of keys to the encryption key table 64 in the present embodiment involves a key authentication process. For that reason, although it is accurate, the registration requires long processing time. In addition, high-speed processing is required since registration/removal of entries to/from the TLB/AMR expansion unit 63 are performed frequently. In order to reduce processing time, the present embodiment introduces the concept of license information, which provides a holder (program) of a key with a right of registration to the TLB/AMR expansion unit 63. The license information is issued only to programs (authenticated program) whose key (encryption key) is registered in the encryption key table 64. Since the data space of the authenticated program can be encrypted, even if the license information is located in the memory 50, other programs cannot refer to the authenticated program's data space.

The license information is valid in the section where the key survives, or in other words during the time period when a program key is authenticated and registered in the encryption key table 64 to when the key is removed from the encryption key table 64. The above key survival section is usually the same as an execution section of the program.

Because the license information is issued only to the S=1 program, by storing the information in the encryption space, which can be used by the S=1 program, it is not revealed by the other accesses.

When the key authentication is completed and the parent program acquires license information, as described above, a process to allocate the child program to actual memory space can be performed.

(3) The parent program searches the TLB/AMR entry, which manages the memory space where the child program is actually allocated, using a software process before starting the above authenticated child program. The key ID set in an encryption key table 64's entry that stores a key to be used by the child program (child program key) and the license information stored in (2) are set to a register in the public IF 81 of the secure assist 80. Afterwards, the "TLB/AMR expansion unit registration command" is also set to the command register in the public IF 81. When the above registration command is set to the secure assist 80, the license check unit 65 examines the above license information's accuracy. The license information's examination is performed by determining if the license information stored in the parent program matches the license information stored in the relevant entry of the encryption key table 64. When the two license information match, the license information are correct. If the license information is determined to be correct, the key ID is set in the relevant entry of the TLB/AMR expansion unit 63. By so doing, the encryption key table 64 storing the child program key is linked to the relevant entry of the TLB/AMR expansion unit 63. This link allows the use of the child program key in the encryption key table 64 designated by the key ID, when TLB/AMR of the secure processor corresponding to the relevant entry of the TLB/AMR expansion unit 63 is used.

(4) In order for the parent program to start the child program, if the relevant entry of TLB in the secure processor is accessed, the child program key of the child program is read from the encryption key table 64 by the link between the above entry of the TLB/AMR expansion unit 63 using the key ID and the entry of the encryption key table 64 and the child program key is provided to the encryption process pipe 62.

(5) The common-key encrypted child program read from the memory 50 is decrypted to a plain text child program by the encryption process pipe 62 using the child program key and the plain text child program is provided to the processor core 10. As described above, the processor core 10 is able to execute the child program normally.

[Configuration of the Encryption Key Table]

FIG. 7 is a diagram showing an example of the configuration of the encryption key table 64 provided in the secure pipe 60.

The encryption key table 64 is a table that registers a key (encryption key) used in the object (program). An S=1 parent program registers the public-key encrypted encryption key used in the child program to the encryption key table 64 with the key attribute when the encryption key is authenticated. The encryption key is registered to the encryption key table 64 only when it is authenticated. When it is registered, the parent program receives license information from secure hardware. When the encryption key is registered in the encryption key table 64, in order to indicate that the encryption key is reliable, the S-bit is set as "1".

In the present embodiment, one key is prepared for an object (program), library, and a data space. The encryption key table 64's entry is comprised of four items: "key attribute" (16 bits in the example of FIG. 7), "S-bit (secure bit)" (1 bit in the example of FIG. 7), "key (encryption key)" (256 bits in the example of FIG. 7), and "license information (the first license information)" (32 bits in the example of FIG. 7). Among these items, the key attribute and the S-bit can be accessed by software; however, the encryption key and license information cannot be accessed by software.

The key attribute is an attribute of an encryption key (encryption system, key length, block length etc.) stored in one entry. The S-bit indicates that the encryption key stored in one entry is authenticated, and if the key is authenticated, the S-bit is set as "1". The encryption key is a key used for program encryption. The encryption key cannot be accessed by software. The license information is a confirmation number of a holder (parent program) used when expansion/deletion of the encryption key space.

Here, the expansion/deletion of the encryption key space is explained.

The expansion of the encryption key space indicates the generation of encryption key space. In the present embodiment, it indicates key authentication or key generation for encryption key space generation (registration of an entry to the TLB/AMR expansion unit 63 after registration of the encryption key to the encryption key table 64). Elimination of the encryption key space indicates temporal or permanent deletion of encryption key space. In the present embodiment, elimination of encryption key space indicates key save or key deletion for encryption key space deletion (deletion of a relevant entry of the TLB/AMR expansion unit 63 after deleting the encryption key from the encryption key table 64, or invalidation of the relevant entry of the TLB/AMR expansion unit 63 associated with the S-bit of the relevant entry of the encryption key table 64 cleared to "0" by the license information mismatch of the encryption key table 64 and the TLB/AMR expansion unit 63 by the encryption key's access after deletion).

The registration of a new entry to the encryption key table 64 is permitted to be accessed only by a supervisor and the S=1 program. The expansion/deletion of the encryption key space is permitted to be accessed only by a supervisor and the S=1 program, when the license information matches (the license information stored in the program matches to the license information registered in the encryption key table 64).

The empty entry of the encryption key table 64 is managed using the program executed in the processor core 10. In the present embodiment, the number of the entry (entry number) is used as a number (key ID) assigned to the encryption key registered in the entry of the encryption key table 64.

[Configuration of TLB/AMR Expansion Unit]

FIG. 8 is a diagram describing the configuration of the TLB/AMR expansion unit 63 provided in the secure pipe 60.

The TLB/AMR expansion unit 63 comprises a function for adding a secure function enhancement attribute to the TLB/AMR of the processor core 10 and is configured to have one-to-one correspondence with the TLB/AMR of the processor core 10. Therefore, the number of entries of the TLB/AMR expansion unit 63 is the same as the number of entries of the TLB/AMR of the processor core 10. The parent program, which has the license information, has the registration right of the TLB/AMR expansion unit 63 to the entry.

The TLB/AMR expansion unit's entry comprises four items of "S-bit" (1 bit in the example of FIG. 8), "key ID" (8 bits in the example of FIG. 8), and "license information (second license information)" (16 bits in the example of FIG. 8). Among these items, the S-bit and key ID can be accessed by software; however, the license information cannot be accessed by software.

The key ID is equal to the entry number of the encryption key table 64. The S-bit is a copy of the S-bit registered in the entry of the encryption key table 64's key ID. The S-bit, in the authentication mode 1, denotes that the relevant key (the encryption key registered in the entry of the key ID of the encryption key table) is authenticated and that the encryption is requested. In the authentication mode 2, S-bit denotes that the relevant key and the relevant page are authenticated and that the encryption is requested.

"The encryption is requested" indicates that if an access address, when the processor core 10 issues the load/store command, refers to the TLB/AMR entry, in which the S-bit of the corresponding entry of the TLB/AMR expansion unit 63 is "1", the S-bit of the TLB/AMR is also "1" (since the S-bit of TLB/AMR is a copy of the S-bit of the corresponding entry of the TLB/AMR expansion unit 63). For that reason, when the load/store command is issued from the processor core 10, a signal of S-bit=1 is transmitted to the command buffer 61 at the same time. As described above, according to the command that the signal of S-bit=1 is transmitted to the command buffer at the same time, the secure pipe 60 is activated and starts the encryption process.

The present embodiment is comprised of a configuration in which, when the access address of the command indicates an address in the memory 50, if the command with the S-bit indicates "1" inputs to the command buffer 61, the encryption process is executed using secure hardware. If the S-bit is "0", the encryption process is not executed. The present embodiment is also comprised of a configuration in which, when the access address of the command is the secure hardware, if the command with the S-bit indicates "1" inputs to the command buffer 61 indicates "1", the access is permitted, and if it is "0", the access is not permitted (or, insignificant response is returned).

The license information stored in the processor core 10 consists of 32-bit corresponding to the license information of the encryption key table 64. For access to the TLB/AMR expansion unit, lower 16 bits are used. This is used for reducing data and high-speed access to the TLB/AMR expansion unit, for example. However, it does not prevent the use of the whole license information.

[Configuration of the TLB/AMR of Processor Core]

Figure 9A:
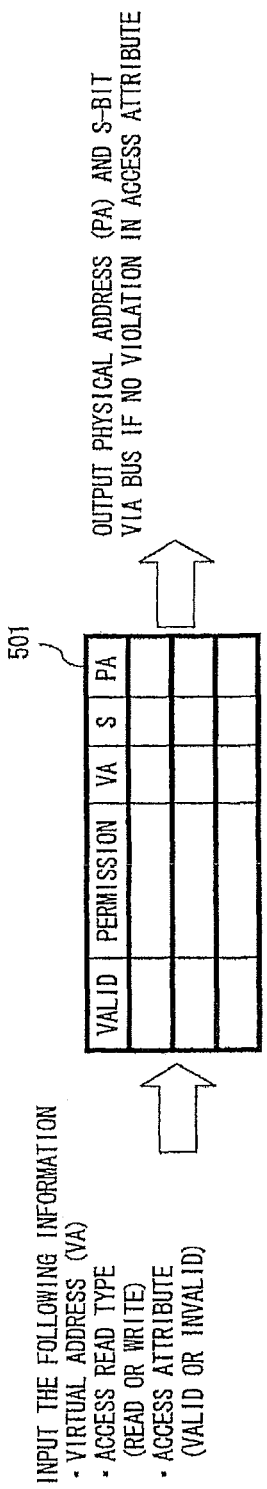
FIG. 9A is a configuration diagram of TLB/AMR comprised in the processor core.

FIG. 9A is a configuration diagram of TLB/AMR comprised in the processor core 10.

The entry of TLB/AMR 501 of the processor core 10 comprises items of "valid", "permission", "Virtual Address (VA)", "S-bit", and "Physical Address (PA)". "Valid" is information indicating whether or not the entry is valid. "Permission" is information indicating whether or not the address conversion is permitted (readable or not etc.). VA is a virtual address (logical address) that is a target of address conversion by the entry. PA is a physical address after the address conversion of VA. The S-bit is the bit with the same function as explained in FIG. 5A, and when the address conversion is permitted, it is output to the bus interface (not shown in the drawings) with PA. The address conversion is permitted when the there is no violation in the access attribute.

Figure 1:
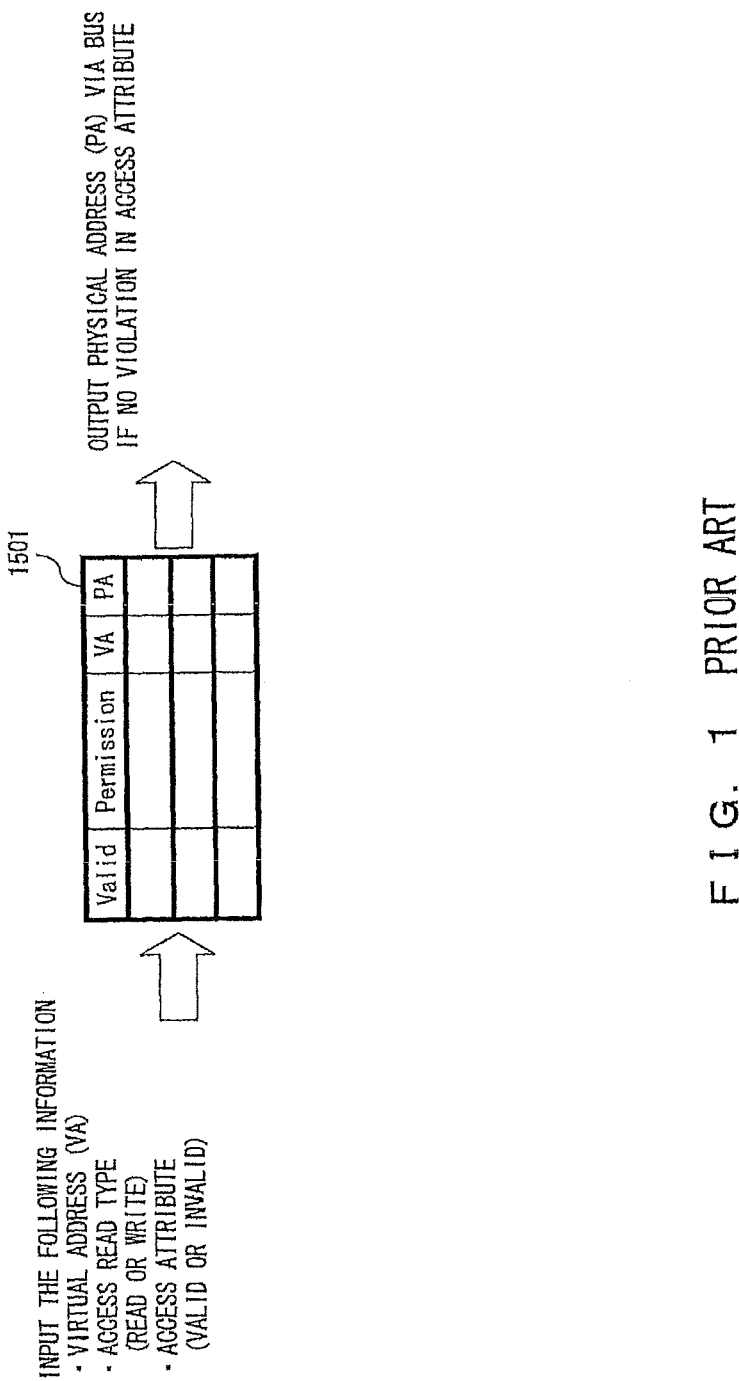
FIG. 1 is a pattern diagram describing a configuration of TLB/AMR comprised in a processor core of the conventional secure processor.

It is obvious from the comparison between FIG. 9A and FIG. 1 that the feature of TLB/AMR 501 of the processor core 10 of the present embodiment is the S-bit in the entry.

[Relationship Between TLB/AMR of Processor Core and TLB/AMR of Secure Pipe]

Figure 9B:
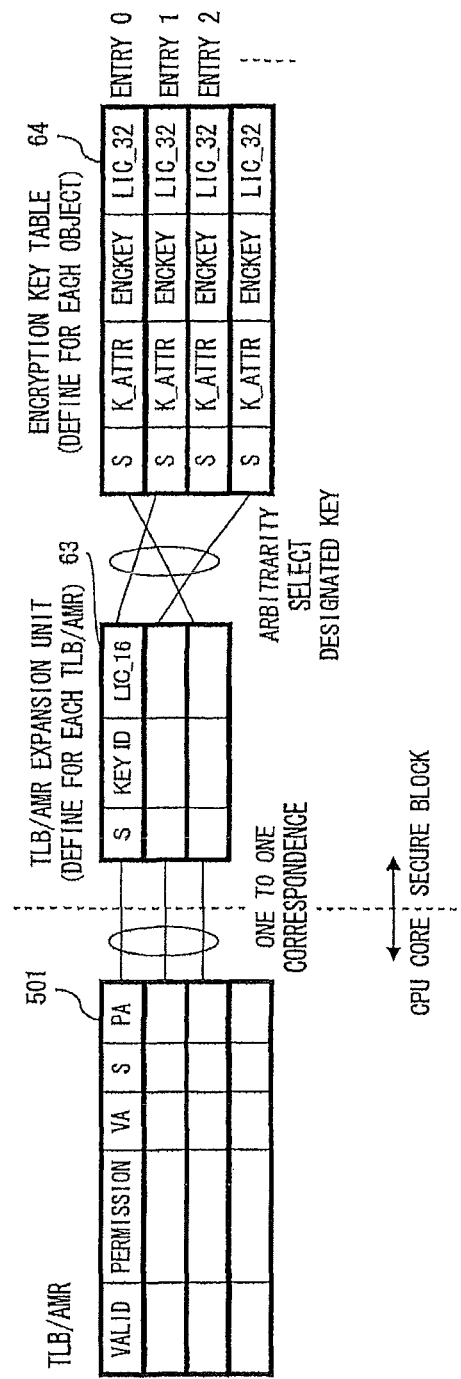
FIG. 9B is a diagram showing the relation between TLB/AMR of the processor core and the TLB/AMR expansion unit of the secure pipe.

FIG. 9B is a diagram showing the relation between TLB/AMR 501 of the processor core 10 and the TLB/AMR expansion unit 63 of the secure pipe 60. Note that the CPU core to the left of FIG. 9 indicates hardware comprising the processor core 10 and the secondary cache 20.

The S-bit of TLB/AMR 501, comprised in the processor core 10 of the present embodiment, is copied when the S-bit is registered in the corresponding entry of the TLB/AMR expansion unit 63 of the secure pipe 60. The copy is generated by the secure hardware (secure block) and cannot be generated by software. When the S-bit is cleared (when the S-bit is set at "0") in TLB/AMR of the processor core 10, the S-bit in the TLB/AMR expansion unit 63 corresponding to the S-bit is also cleared. By so doing, the TLB/AMR expansion unit 63's entry, in which the S-bit is cleared, becomes invalid. If the encryption key registered in the encryption key table 64 is rewritten, the license information in which the encryption key of the encryption key table 64 is registered mismatches the license information of the entry to which the key ID of the encryption key of the TLB/AMR expansion unit 63 is set (mismatch in lower 16 bits in the present embodiment). Thus the above S-bit of the TLB/AMR expansion unit 63 is cleared.

The above noted mismatch of the license information is explained. When the program execution using the encryption key is terminated, the encryption key is removed from the encryption key table 64 and the license information of the encryption key is also removed from the encryption key table 64. Therefore, when the memory is accessed with reference to TLB/AMR in the processor core 10 side, at the license check, the license information stored in the TLB/AMR expansion unit 63 mismatches the corresponding license information in the encryption key table 64 (the license information stored in the encryption key table 64's entry designated by the corresponding key ID of the TLB/AMR expansion unit 63).

The parent program storing the license information has the right to register to the TLB/AMR expansion unit 63's entry. As described above, the key ID registered in the entry of the TLB/AMR expansion unit 63 is an entry number of the encryption key table 64. The encryption key (ENCKEY) with the key ID is provided from the encryption key table 64 to the encryption process pipe 62 using the key ID registered to the entry of the TLB/AMR expansion unit 63.

[Management of Encryption Key Table]

In the secure processor of the present embodiment, the management of the encryption key table 64 is performed by four processes of "key authentication", "key generation", "key storage", and "key removal".

[Key Authentication Process]

Figure 10A:
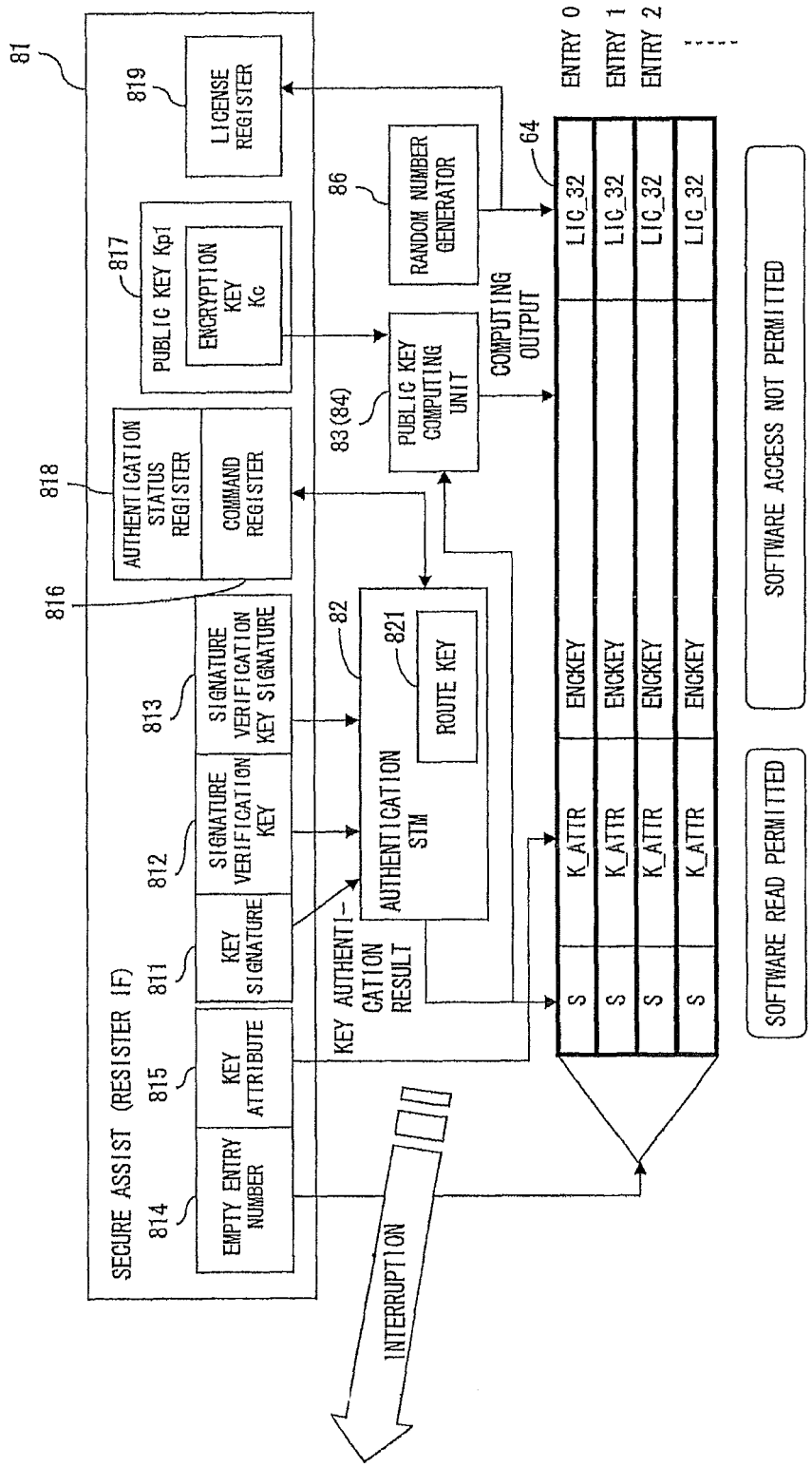
FIG. 10A is a pattern diagram showing operation outline of the secure hardware in the key authentication process.

FIG. 10A is a pattern diagram showing an operation outline of the secure hardware in the key authentication process.

The outline of the key authentication process executed in the secure hardware shown in FIG. 10A is as follows.

The control procedure of the key authentication is explained.

(1) An empty entry is selected from the encryption key table 64. In the secure processor of the present embodiment, the program executed in the processor core 10 manages the encryption key table 64. Management can be realized, for example, by implementing the management table of the encryption key table 64 in the storage area of the secure processor and by managing the management table using the program.

(2) The parent program sets the "key authentication information" (key signature (S1), signature verification key ($K_p2$), and signature verification key signature (S2)), "empty entry number" (an entry number of the empty entry of the encryption key table 64), "key attribute", and "encryption key $K_s1$ that is public-key encrypted by the public key $K_{px}1$" of the child's code or data to a register provided in the public IF 81 of the secure assist. In other words, as shown in FIG. 10A, the key signature, signature verification key, and signature verification key signature are, respectively, set to registers 811, 812, and 813 in the public IF 81. The empty entry number and the key attribute are, respectively, set to registers 814 and 815 in the public IF 81. In addition, "the encryption key (secret key) $K_c$ encrypted by the public key $K_p1$" is set to a register 817.

(3) The parent program sets "authentication starting command" to the command register 816 in the public IF 81. By so doing, the secure assist 80 is started, and a key authentication process (a hardware key authentication process) is executed using the secure hardware. The hardware key authentication process is performed by a secure controller 82 (an authentication state machine) in the secure assist 80. While the authentication state machine performs the hardware key authentication process, the parent program is in the termination waiting state of the key authentication process.

(4) The authentication state machine reads the key signature, the signature verification key, and the signature verification key signature from the registers 811-813 of the public IF 81, respectively, and performs key authentication using the above information and a route key sorted in the authentication list 87 in its own block. The route key is a key in the highest level of the authentication, and the public key $K_p3$ is the route key in the example of FIG. 4D. Authentication is performed under an assumption that the route key is delivered properly, and therefore, the route key is devised like hardware so as not to be changed.

(5) The authentication state machine, when the key authentication process is terminated, outputs a signal indicating the process result to the public key operation unit 83 (84). The authentication state machine, when the above key authentication is properly terminated, reads the empty entry number and the key ID from the registers 814 and 815, respectively, of the public IF 81, sets the S-bit of the entry of the encryption key table 64 designated by the empty entry number to "1", and sets the above key attribute to the entry. The authentication state machine further sets the authentication status indicating the key authentication result to an authentication status register 818 of the public IF 81.

(6) The public key operation unit 83(84), if the key authentication result input from the authentication state machine indicates a signal indicating the proper termination of the key authentication of the authentication state machine, the public-key encrypted encryption key $K_c$ is decrypted by the secret key $K_s1$, not shown in the drawings, stored in the route key 821 and the decrypted encryption key $K_c$ is set to the entry of the encryption key table 64. The public key operation unit 83(84) also starts the random number generator 86.

(7) The random number generator 86 sets the generated license information (32 bits) to the entry of the encryption key table 64 and sets the license information to a license register 819 of the public IF 81.

(8) The secure assist 80, when the encryption key table 64 is updated as above, informs the parent program of the "key authentication process termination" interruption (9) The parent program reads the authentication status from the authentication status register 818 of the public IF 81. If the key authentication is confirmed, and the key authentication is correct, the license information is obtained from the license register 819 of the public IF 81 and stored.

{Key Authentication Process of Authentication Mode 1}

Figure 10B:
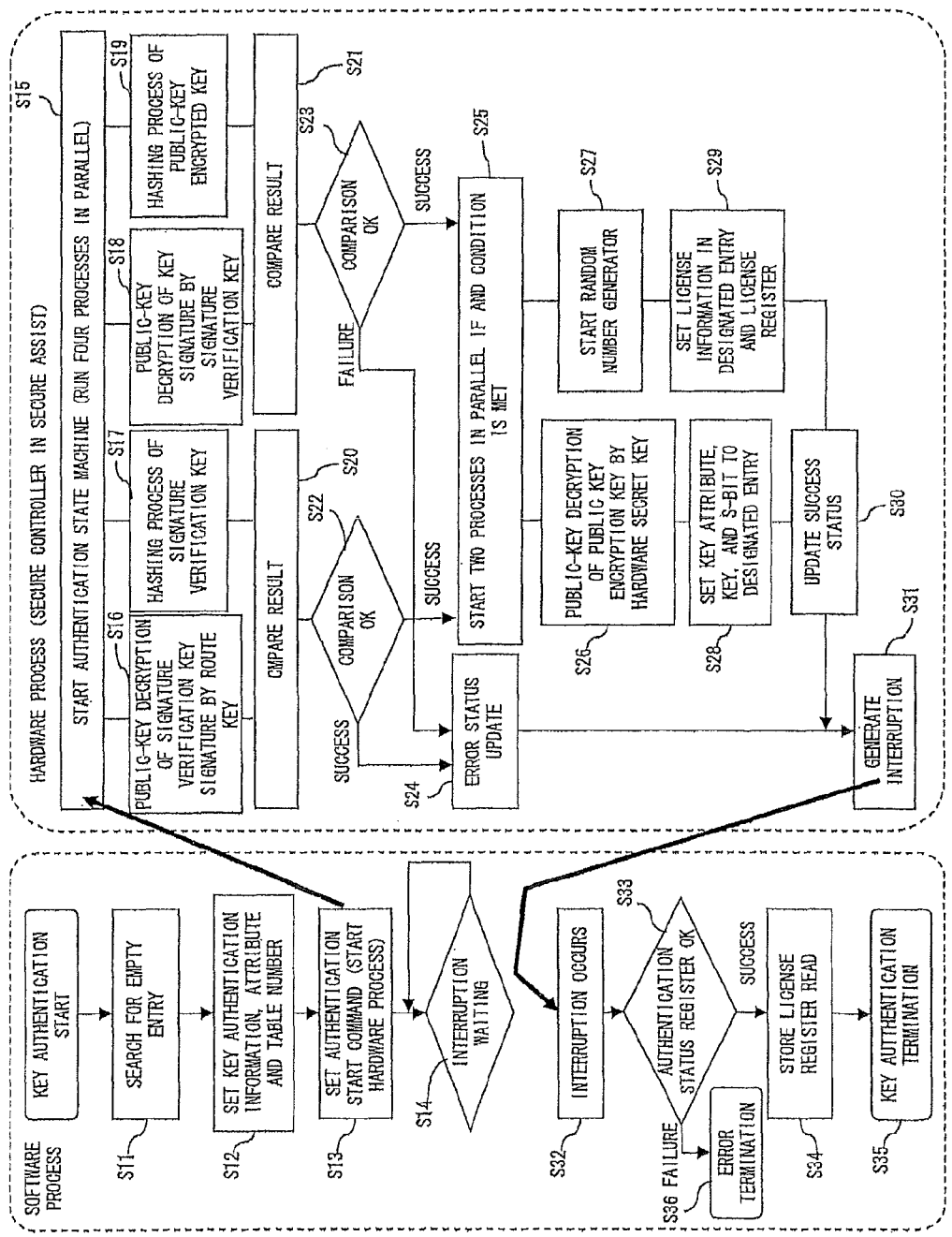
FIG. 10B is a flowchart showing the procedure of the authentication process in the authentication mode 1.

FIG. 10B is a flowchart showing the procedure of the authentication process in the authentication mode 1.

The software process shown on the right side of FIG. 10B indicates the process procedure of the program executed by the processor core 10. The hardware process shown in the left side of FIG. 10B indicates the process procedure performed by the secure controller 82 of the secure assist 80.

The program searches for an empty entry of the encryption key table 64 (S11), and sets the entry number of empty entry (empty entry number), the key authentication information (key signature, signature verification key, the signature verification key signature), and key attribute (S12) to the register of the secure assist 80's public IF 81.

The program, next, sets the authentication start command to the command register 816 of the public IF 81 (S13) and enters a waiting state, waiting for interruption from the secure assist 80 (S14).

In step S13, using the authentication starting command being set to the command register 816, the secure controller 82 in the secure assist 80 starts the authentication state machine (S15). The authentication state machine runs in parallel the four processes of a process decrypting the signature verification key signature by the route key (signature verification key) (S16), a process for applying the hashing operation to the signature verification key (S17), a process for public-key decrypting the key signature by the signature verification key (S18), and a process for applying the hashing operation to the key (public key encrypted key) (S19).

The authentication state machine compares the process result of step S16 with that of step S17 (S20) and also compares the process result of step S18 with that of step S19 (S21). Afterwards, the comparison result of step S20 is determined (S22) to be a success or a failure, as well as determining whether the comparison result of step S21 is a success or a failure (S23). If either step S22 or S23 fails, "error status" is set to the authentication status register 818 of the public IF 81 (S24). On the other hand, if both step S22 and S23 succeed, two processes for decrypting the public-key encrypted key using the hardware secret key (public key decryption) (S26) and the process for starting the random number generator 86 are started in parallel (S25).

The authentication status machine, when the process in step S26 terminates, sets the key obtained in the process, the key attribute set to the register 815 of the public IF 81, and the S-bit of "1" (S28) to an entry (designated entry) of the encryption key table 64 designated by the empty entry number set to the register 814 of the public IF 81. The license information generated by the random number generator 86 is set to the designated entry of the encryption table 64 and the license register 819 of the public IF 81 in step 29 (S29).

The authentication state machine, when both processes of step S28 and step S29 terminate, sets "success status" to the authentication status register 818 of the public IF 81 (S30).

The authentication state machine, when the process of step S24 or step S30 terminates, generates interruption to the processor core 10 (S31).

Using the above interruption generation, the interruption occurs in the parent program executed in the processor core 10 (S32). The parent program, upon receiving the interruption, obtains status information from the authentication status register 818 of the public IF 81 of the secure assist 80 and determines whether the key authentication in the authentication mode 1 succeeded or failed (S33). When it is determined that the authentication succeeded, the license information is read from the license register 819 of the public IF 81 of the secure assist 80, and is stored in a predetermined storage region (S34). The key authentication is terminated afterwards (S35).

{Key Authentication Process of Authentication Mode 2}

Figure 10C:
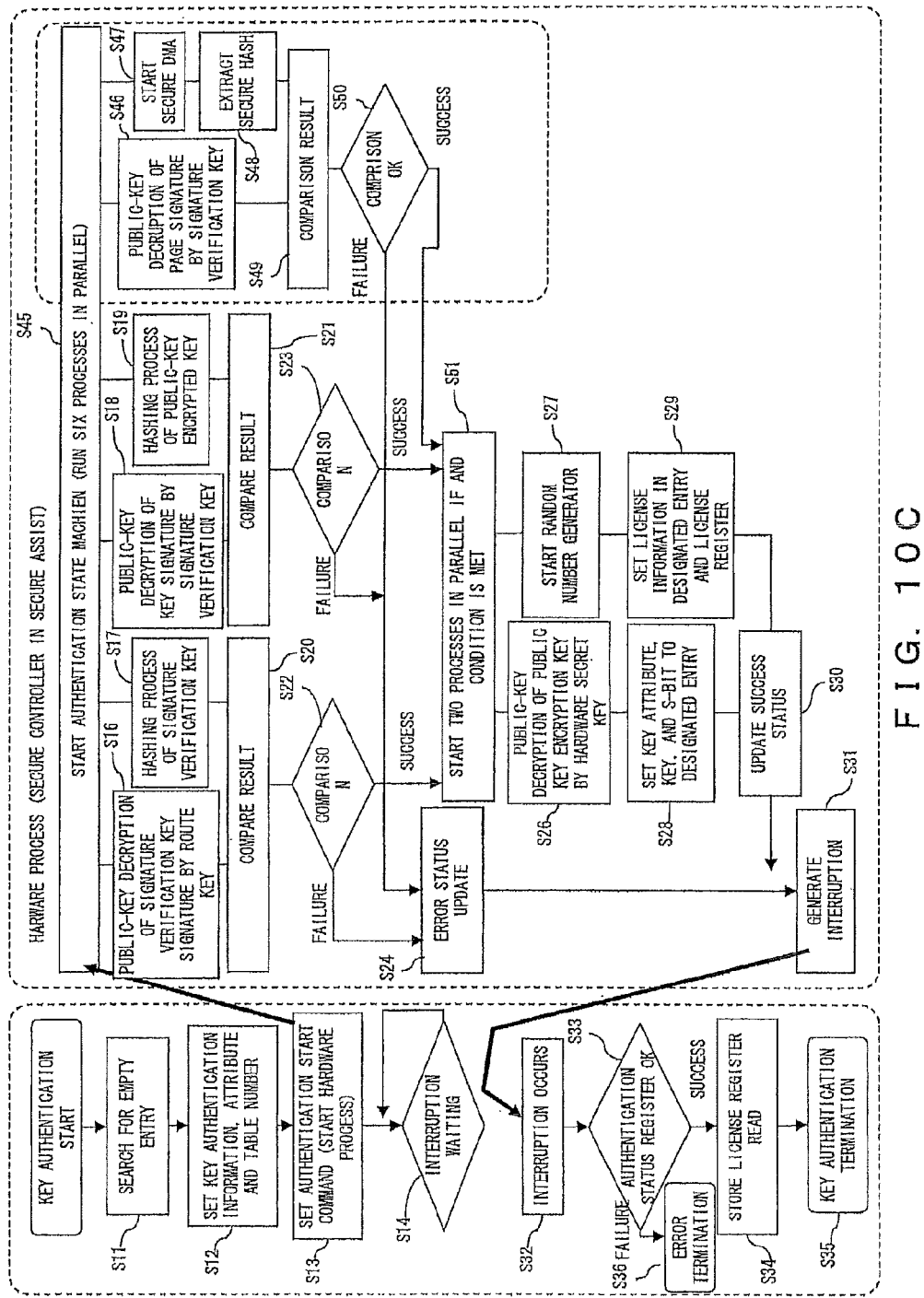
FIG. 10C is a flowchart showing procedures of authentication process in the authentication mode 2.

FIG. 10C is a flowchart showing procedures of authentication process in the authentication mode 2.

In the authentication mode 2, page verification is performed in addition to the authentication of the code encryption key. The page verification is performed using a hashing operation function of the secure DMA 70.

In FIG. 10C, the steps that perform the same processes as the steps in FIG. 10B are provided with the same step numbers. In the following explanation of the flowchart of FIG. 10C, the process procedures, which are different from the process procedures of the flowchart of FIG. 10B, or in other words, the process procedures unique to the authentication mode 2, which are not comprised in the authentication mode 1, only are set forth.

When the parent program performs the processes of steps S11-S13, and the authentication starting command is set to the command register 816 of the public IF 81 of the secure assist 80, the authentication state machine of the authentication mode 2 (hereinafter referred to as the authentication state machine) is started by the secure controller 82 in the secure assist 80 (S45).

The authentication state machine, in addition to the four processes of steps S16-S19 of FIG. 10B, starts in parallel a process for public-key decrypting the page signature by the signature verification key (S46) and starts the process of the secure DMA 70 (S47).

The secure DMA 70 applies hashing operation to the instruction code or data of the page where the page signature of step S47 is performed and outputs the operation result to the secure controller 82 (authentication state machine) (S48).

The authentication state machine compares the result obtained in step S46 with the result obtained in step S48, and determines whether or not the two results match (the page verification succeeded) or mismatch (the page verification failed) (S50). Afterwards, it is determined whether or not all of the page verification results and the authentication results of steps S22 and S23 are successful. If all of the results are successful, the processes of step S26 and step S28 are started in parallel. The processes of steps S28-S31 explained in FIG. 10B are subsequently performed, and the processor core 10 is informed of the interruption.

As described above, in addition to the authentication of the authentication mode 1, page verification is further performed in the authentication mode 2, and an examination is conducted as to whether or not the page is falsified.

{Key Generation Process}

In the key generation process of the present embodiment, the key for encryption is generated, and the key is registered in the encryption key table 64. By the key generation, the data space of the program, which possesses the generated key, is generated and secured.

FIG. 11A is a pattern diagram showing the operation outline of the secure hardware in the key generation process. The outline of the key generation process performed in the secure hardware shown in FIG. 11A is described below.

(1) The program (software) executed in the processor core 10 is selected by the empty entry of the encryption key table 64.

(2) The program sets the "empty entry number" and the "key attribute" to the registers 814 and 815, respectively, of the public IF 81 of the secure assist 80.

(3) The program sets the "key generation command" to the command register 81 of the public IF 81. By so doing, the key generation state machine (key generation STM) of the secure controller 82 is started, and the key generation state machine executes the key generation process.

(4) The key generation state machine starts the random number generator 86, and cause the random number generator 86 to generate "key" and "license information".

(5) The random number generator 86 sets the generated license information to the license register 819 of the public IF 81, and registers the information to an entry with the empty entry number of the encryption key table 64. The random number generator 86 outputs the generated key to the key generation state machine.

(6) The key generation state machine, when a key is input from the random number generator 86, registers the key to the entry of the encryption key table 64, and the S-bit of the entry is set at "1". The key generation state machine additionally reads the key attribute from the register 815 of the public IF 81 and registers the key attribute to the entry of the encryption key table 64.

(7) The key generation state machine terminates the key generation process in the manner described above and sets status information indicating whether or not the key generation process succeeded to the generation status register 820 and notifies the program of the termination of the key generation process using interruption.

Figure 11B:
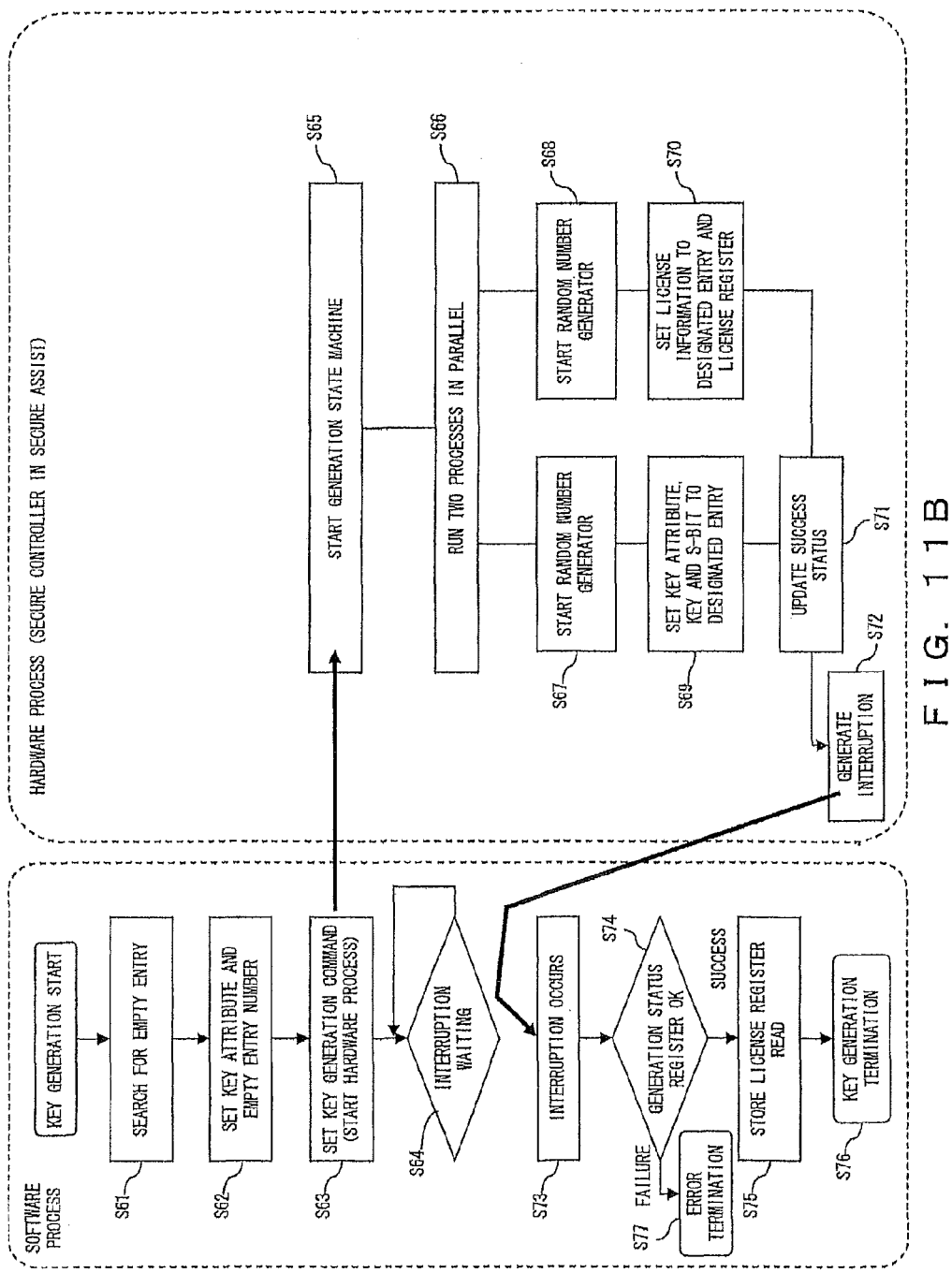
FIG. 11B is a flowchart indicating detailed procedures of the key generation process executed by the secure processor of the present embodiment.

FIG. 11B is a flowchart indicating detailed procedures of the key generation process executed by the secure processor of the present embodiment. The software process using the program executed in the processor core 10 is shown in the dashed line frame to the right of FIG. 11B, and the hardware process using the secure controller 82 in the secure assist 80 is shown in the left side of FIG. 11B.

The program executed by the processor core 10 searches for the empty entry of the encryption key table 64 (S61) and sets the entry number of the empty entry obtained by the search (empty entry number) and the key attribute to the registers 814 and 815 of the public IF 81 of the secure controller 82 (S62). Next, the program sets the key generation command to the command register 816 of the public IF 81 of the command buffer 61 (S63), and becomes waiting state of interruption from the secure assist 80 (S64).

The generation state machine is started in the secure controller 82 using the key generation command set to the command register 816 in step S63 (S65).

The generation state machine starts two processes of the key generation and license information in parallel (S66), starts the random number generator 86 (S67), and starts the random number generator 86, (S68). The random number generator 86 performs both of the above parallel processes. In such a case, the configuration may be varied so that two random number generators 86 are provided and the processes of the key generation in step S67 and that of the license information generation in step S68 are shared by two random number generators 86.

The generation state machine, when the process of step S67 ends, registers in the entry (designated entry) designated by the empty entry number of the encryption key table 64, the "key" obtained in step S67, the "key attribute" set to the register 815 of the public IF 81, and the S-bit set at "1" (S69). When the process of step S68 ends, the license information generated in step S68 (32 bits) is registered in the designated entry of the encryption key table 64. In addition, the license information output from the random number generator 86 is set to the license register 819 of the public IF 81 (S70).

The generation state machine, when both of the processes of step S69 and of step S70 end, sets "success status information" to the generation status register 820 (S71). Afterwards, the generation state machine generates and outputs the interruption to the program executed in the processor core 10 (S72).

The program in the waiting state of interruption in the processor core 10, when interruption is input (S73), reads status information set to the generation status register 820 of the public IF 81 of the secure assist 80 and determines whether or not the key generation by the generation state machine succeeded (S74). When it is determined that the key generation has succeeded, the program reads the license information (32 bits) from the license register 819 of the public IF 81 of the secure assist 80, stores the information in a prescribed region (S75), and normally terminates the key generation process (S76).

On the other hand, in step S74, when it is determined that the key generation by the generation state machine has failed, the program terminates the key generation process as an error termination (S77).

As described above, in the key generation process performed by linking the program executed in the processor core 10 and the secure hardware, a key and its license information is generated, and those two can be registered in the empty entry of the encryption key table 64 together with the S-bit set at "1". The program can maintain the key's license information registered in the encryption key table 64.

{Key Storage Process}

Figure 12A:
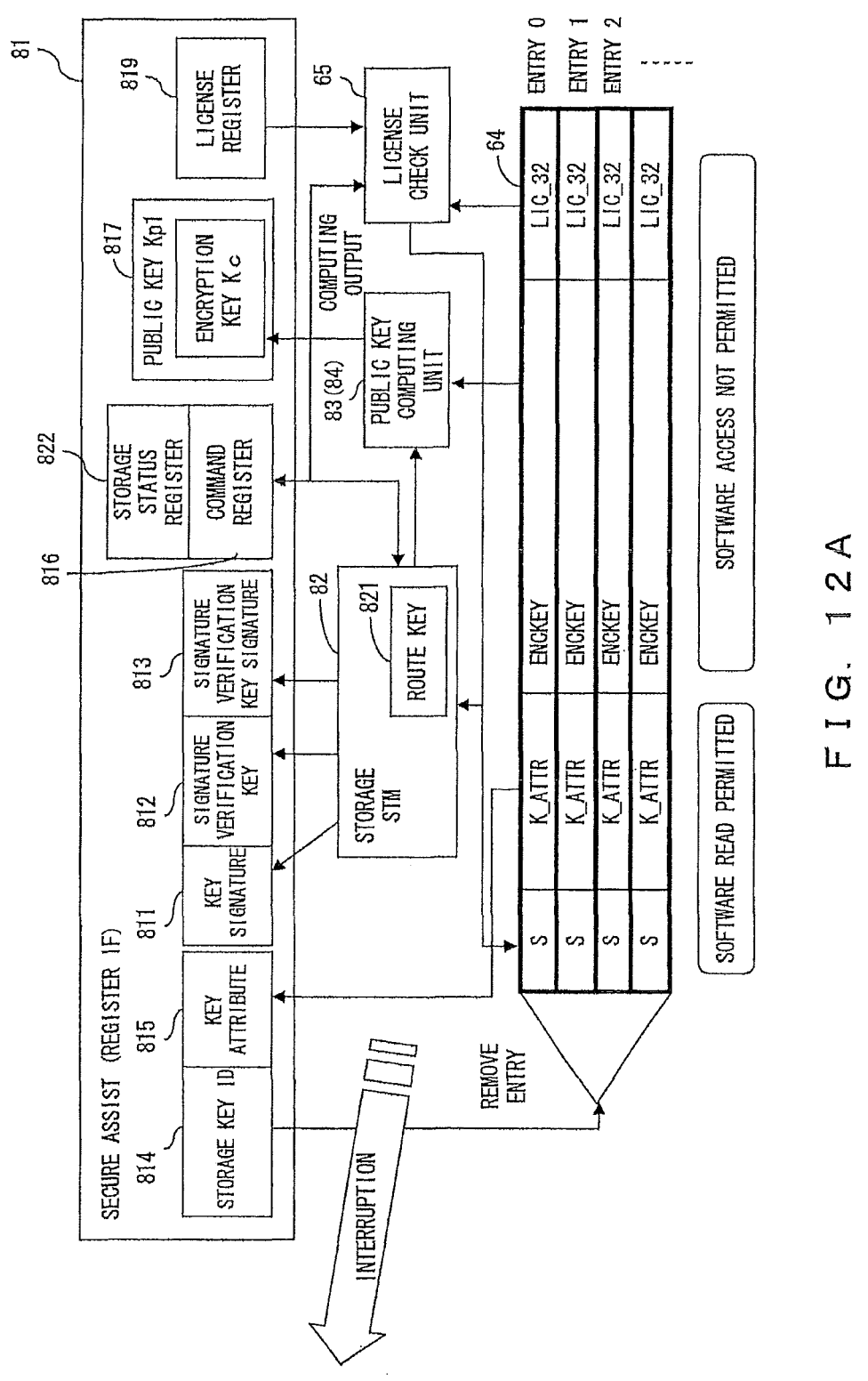

FIG. 12A is a block diagram showing a hardware mechanism for performing the key storage process of the secure processor of the present embodiment.

The outline of the key storage process' procedure by the hardware mechanism shown in FIG. 12A is explained. In the key storage process, the program executed in the processor core 10 stores the key registered in the encryption key table 64. At that time, in addition to the key, authentication information of the key (key signature, signature verification key, and signature verification key signature) is also stored. The key is stored after public-key encryption.

(1) The program executed by the secure processor sets the number of the encryption key to be stored (stored key ID) and the license information of the key to the register 814 and license register 819 in the public IF 81 of the secure assist 80, respectively.

(2) The program sets key storage command to the command register 816 in the public IF 81.

(3) A storage state machine (secure controller 82) starts and performs a license check by comparing the license information set to the license register 819 of the public IF 81 to the license information set to the entry designated by the stored key ID (designated entry) of the encryption key table 64.

(4) The storage state machine, if the license information is consistent in the license check, starts the public key operation unit 83 (84). The public key operation unit 83 (84) encrypts the key $K_c$ (encryption key) registered in the designated entry of the encryption key table 64 by the route key 821 (public key $K_p1$) input from the storage state machine and sets the key $K_c$ (public-key encrypted key) encrypted by the public key $K_p1$ to the register 817. The success status is set to the storage status register 822.

(5) The storage state machine notifies the program of the termination of the key storage process through interruption.

Figure 12B:
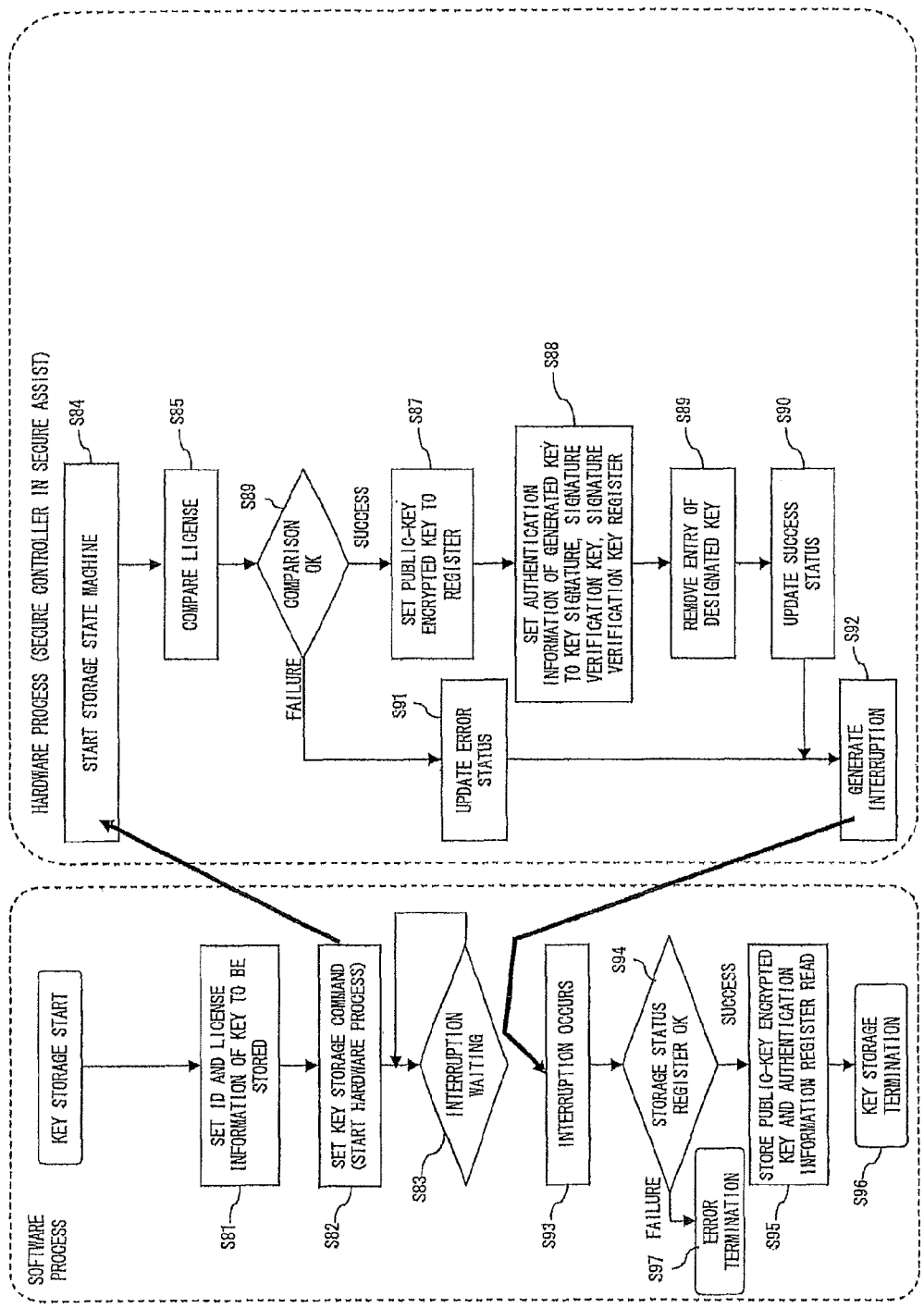
FIG. 12B is a flowchart showing procedure of the key storage process by the secure processor of the present embodiment.

FIG. 12B is a flowchart showing the procedure of the key storage process using the secure processor of the present embodiment. The software process by the program executed using the processor core 10 is indicated in the dashed line frame in the right side of FIG. 123, and the hardware process by the secure controller 82 (storage state machine) of the secure assist 80 is indicated in the dashed line frame in the left side of FIG. 12B.

The program sets the key ID to be stored (stored key ID) and the license information of the key to the register 814 and the license register 819, respectively, in the public IF 81 of the secure controller 82 (S81). The program sets the storage command to the command register 816 in the public IF 81(S82), and enters an interruption waiting state from the storage state machine (S83).

By setting the storage command, the storage state machine is started in the secure controller 82 (S84). The started storage state machine performs a license check by comparing the license information set to the license register 819 in the public IF 81 with the license information registered in the entry (designated entry) designated by the storage key ID of the encryption key table 64 (S85).

The storage state machine determines the result of the license check (S86), reads the key registered to the designated entry of the encryption key table 64 if the license check succeeds (both of the license information match), and inputs the key to the public key operation unit 83 (84). The storage state machine outputs the public key $K_p1$, which makes a pair with the secret key $K_s1$ (not shown in drawings) in the route key 821, to the public key operation unit 83 (84). The public key operation unit 83(84) encrypts the input key (encryption key) $K_c$ by the public key $K_p1$ and the key $K_c$ encrypted by the public key $K_p1$ (public-key encrypted key) is set to the register 817 in the public IF 81 (S87).

The storage state machine sets the public-key encrypted authentication information (key signature, signature verification key, and signature verification key signature) generated by the public key operation unit 83 (84) to the registers 811-813 (S88). The storage state machine removes the designated entry from the encryption key table 64 and sets the success status to the storage status register 822 in the public IF 81 (S90).

Meanwhile, the storage state machine, if it is determined that the result of the license check failed in step S86, sets an error status to the storage status register 822 (S91).

The storage state machine, when step S90 or step S91 terminates, notifies the program executed in the processor core 10 of the interruption (S92).

The program, when the interruption from the storage state machine occurs (S93), reads the status information from the storage status register 822 in the public IF 81, and based on the status information, determines whether or not the key storage process by the storage state machine succeeded (S94). If it succeeded, the program reads the key $K_c9$ encrypted by the public-key encrypted key (public key $K_p1$) from the register 817 in the public IF 81, reads authentication information (key signature, signature verification key, and signature verification key signature) from the register 811-813, stores them in a prescribed storage region (S95), and key storage is terminated (S96). If it failed, on the other hand, the process is terminated as error termination (S97).

As described above, the program executed in the processor core 10 obtains and stores the key (only in the public-key encrypted form) registered in the encryption key table 64 of the secure pipe 60 with the authentication information by linking with the secure hardware using the key storage command.

{Key Removal Process}

Figure 13A:
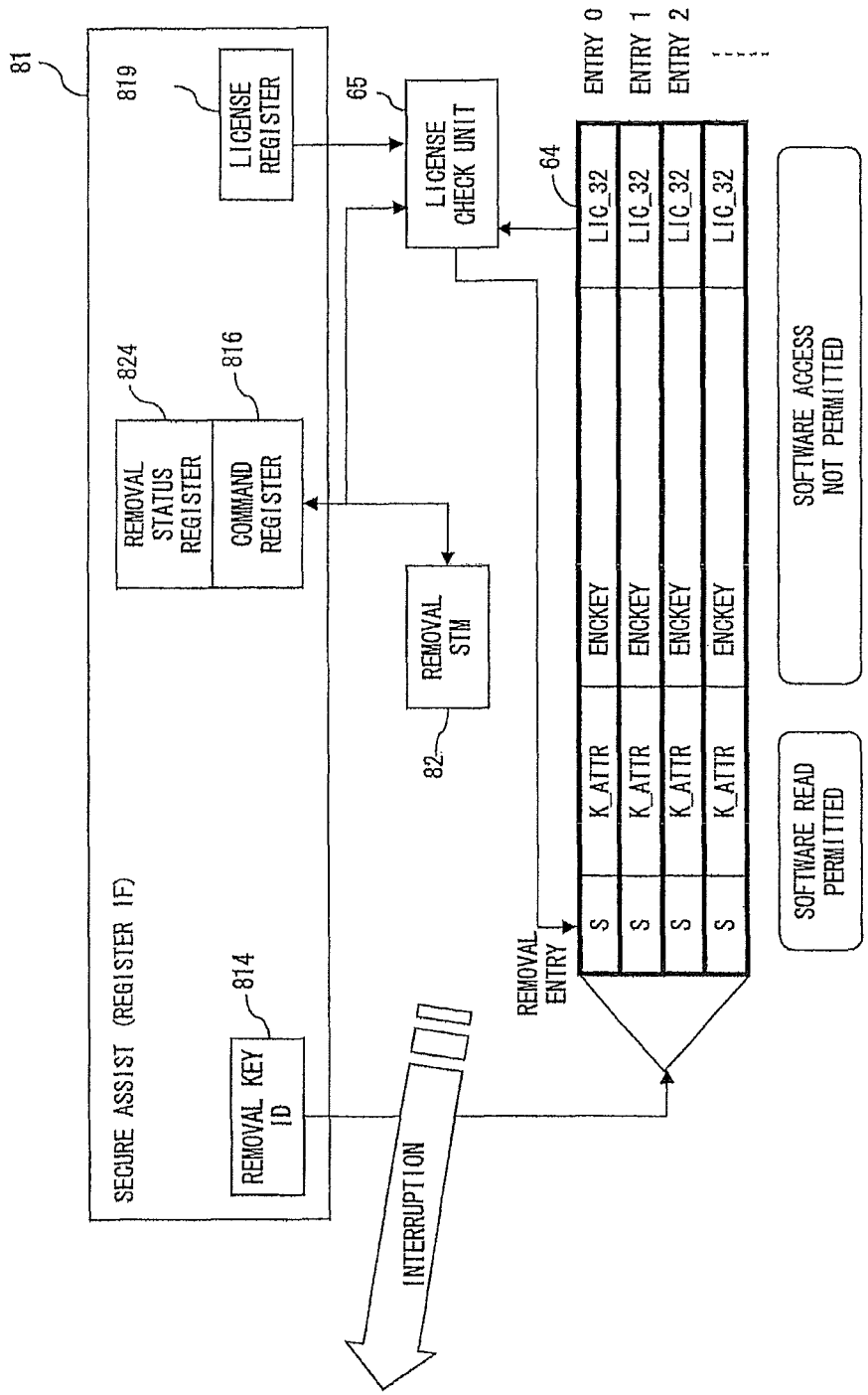
FIG. 13A is a pattern diagram showing the operation outline of the secure hardware in the key removal process of the secure processor of the present embodiment.

FIG. 13A is a pattern diagram showing the operation outline of the secure hardware in the key removal process of the secure processor of the present embodiment.

The outline of the key removal process is performed in the following procedures.

(1) The program executed in the secure processor sets the key ID of the key to be removed (removal key ID) to the register 814 in the public IF 81 of the secure assist 80 and the license information of the key is set to the license register 819.

(2) The program sets the key removal command to the command register 816.

(3) The secure controller 82 (removal state machine) of the secure assist 80 is started by setting the key removal command. The removal state machine 82 activates the license check unit 65. The license check unit 65 compares the license information set in the license register 819 of the public IF 81 with the license information registered in the entry designated by the removal key ID of the encryption key table 64, and determines whether if the information match or not (license check).

(4) After the license check determines that the license information match, the license check unit 65 removes the entry (entry of the designated key) designated by the removal key ID of the encryption key table 64.

(5) The license check unit 65 notifies the program of the termination of the key removal process using interruption.

Figure 13B:
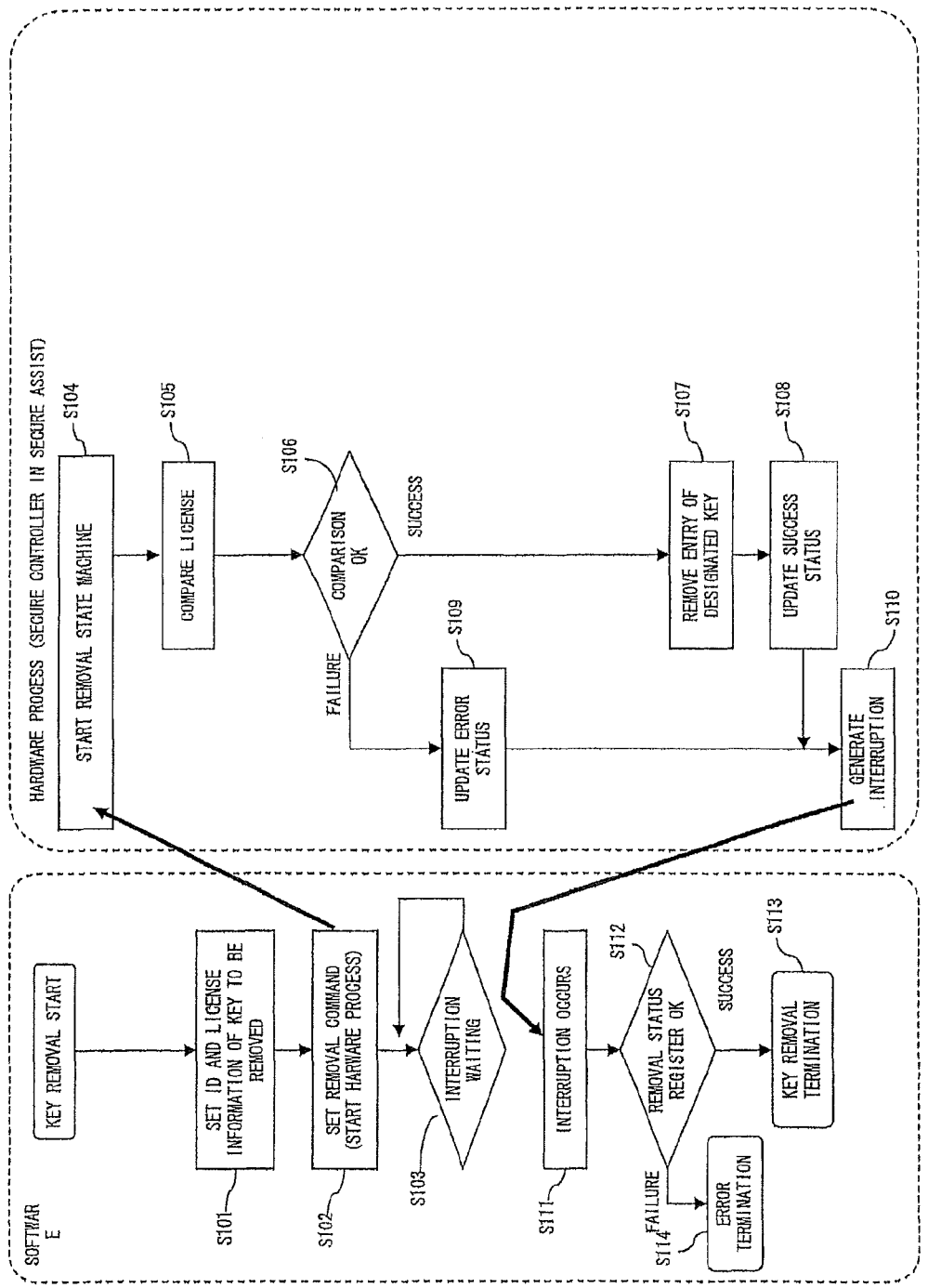
FIG. 13B is a flowchart showing a procedure of the key removal process by the secure processor of the present embodiment.

FIG. 13B is a flowchart showing a procedure of the key removal process by the secure processor of the present embodiment. The software process using the program executed in the processor core 10 is shown in the dashed line frame in the right side of FIG. 13B. Inside the dashed line frame on the left side of FIG. 13B shows a flowchart of the hardware process procedure executed by the control of the secure controller 82 (removal state machine) in the secure assist 80.

The program sets the ID of the key to be removed (removal key ID) and the license information of the key (16 bits) to the register 814 in the public IF 81 of the secure controller 82 and the license register 819, respectively (S101). The program sets the removal command to the command register 816 in the public IF 81 (S102), and enters a waiting state, waiting for interruption from the removal state machine (S103).

By setting the removal command, the removal state machine is started in the secure controller 82 (S104). The started removal state machine performs a license check by comparing the license information set to the license register 819 in the public IF 81 with the license information registered in the entry (removal designated entry) designated by the removal key ID of the encryption key table 64 (S105).

The removal state machine determines the result of the license check (S106). If the license check succeeded (both license information match), the removal designated entry of the encryption key table 64 is removed (S107), and success status is set to the removal status register 824 in the public IF 81 (S108).

Meanwhile, if it is determined that the result of the license check failed in step S106, the removal state machine sets an error status to the removal status register 824 (S109).

The removal state machine, when step S108 or step S109 terminates, notifies the program executed in the processor core 10 of the interruption (S110).

The program, when the interruption from the storage state machine occurs (S111), reads the status information from the storage status register 824 in the public IF 81 and based on the status information determines if the key removal process using the removal state machine succeeded (S121). If it succeeds, the key removal is terminated (S113). If the removal state machine fails, the process is terminated as an error termination (S114).

As described above, the program operating in the processor core 10 removes the key registered in the encryption key table 64 associating with the secure hardware by setting the removal command to the public IF 81 of the secure controller 82.

[Operation of TLB/AMR Expansion Unit 63]

There are three basic operations of the TLB/AMR expansion unit 63.

TLB/AMR Entry Registration

This is an operation that the program (authenticated program) with the license of a key registered in the encryption key table 64 makes the key link to the TLB/AMR expansion unit 63 of the own space. The operation includes the update the registered entry information of the TLB/AMR expansion unit 63.

TLB/AMR Entry Removal

This is an operation to individually remove the entries of the TLB/AMR expansion unit 63 linked to the key registered in the encryption key table 64. The operation can also be performed by overwriting the entry of the TLB/AMR expansion unit 63, or by removing the key from the encryption key table 64. When the key of the encryption key table 64 is removed, the entry of the TLB/AMR expansion unit 63 linked to the key is deleted at the next access to the TLB/AMR expansion unit 63.

TLB/AMR Entry Invalidation

This is an operation to invalidate the applicable entry (secure expansion function of TLB/AMR) of the TLB/AMR expansion unit 63 when the license information of the key registered in the entry of the TLB/AMR expansion unit 63 does not match the license information of the key registered in the entry of the encryption key table 64 linked to the entry, or the S-bit of TLB/AMR of the processor core 10, the S-bit of the TLB/AMR expansion unit 63, and the S-bit of the encryption key table 64 do not match.

{TLB/AMR Entry Registration}

Figure 14A:
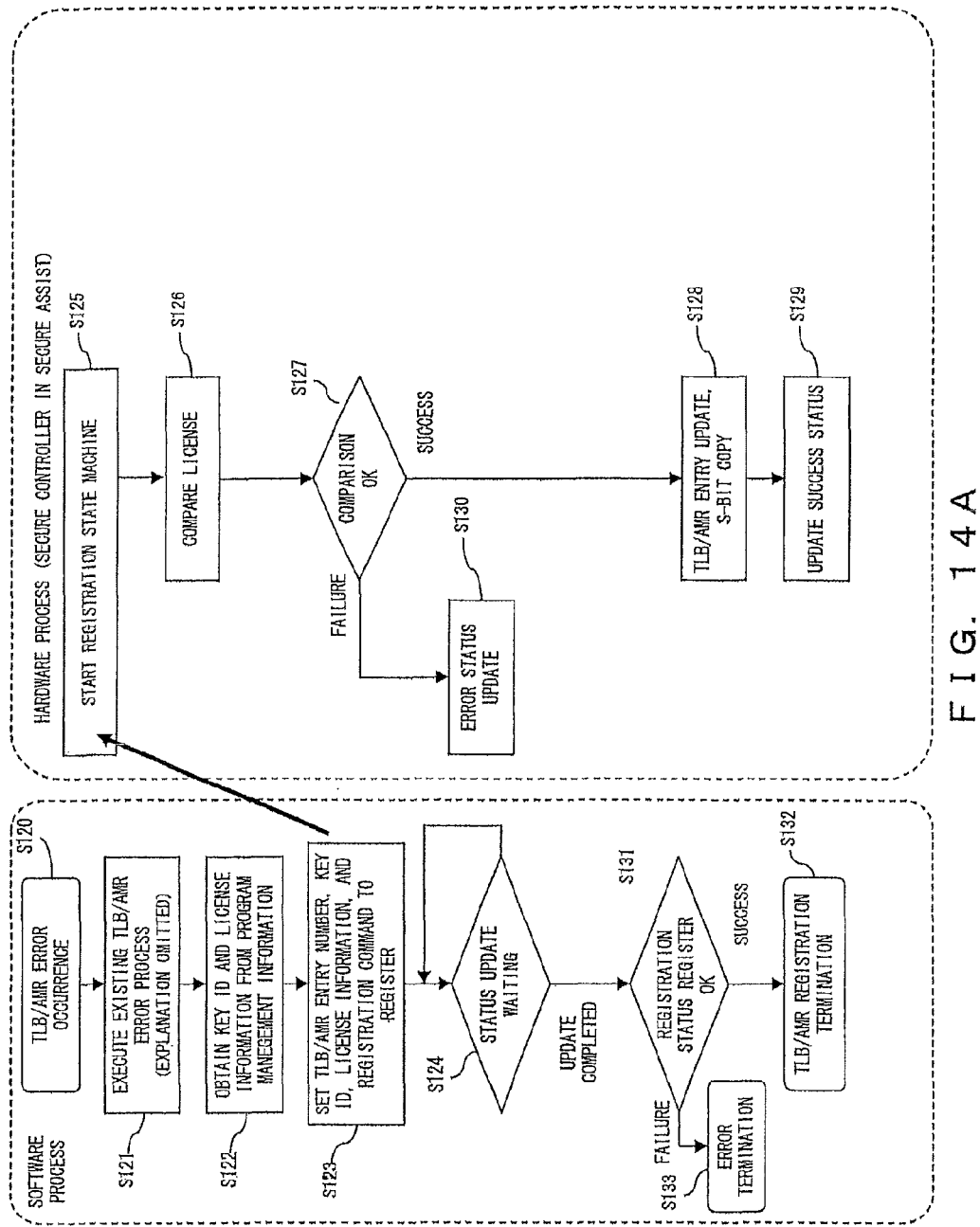
FIG. 14A is a flowchart showing process procedure of the TLB/AMR entry registration operation performed by linking the software process of the processor core and the hardware process by the secure controller in the secure assist.
Figure 14B:
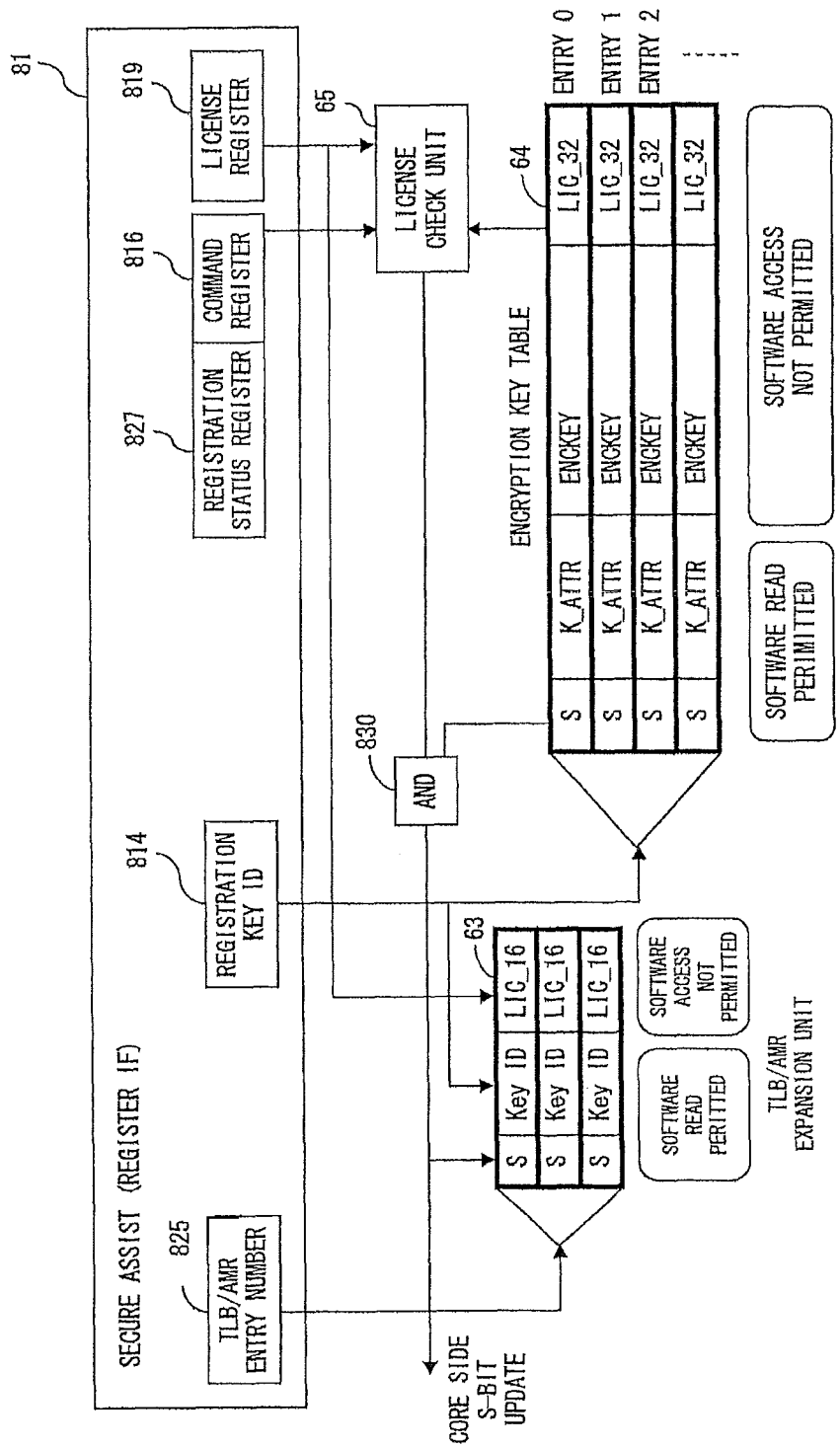
FIG. 14B is a pattern diagram showing an operation of the secure hardware in the process of the TLB/AMR registration operation.

The process of TLB/AMR entry registration operation is explained with reference to FIG. 14A and FIG. 14B. FIG. 14A is a flowchart showing the process procedure of the TLB/AMR entry registration operation performed by linking the software process of the processor core 10 and the hardware process by the secure controller 82 in the secure assist 80. The software process is shown in the dashed line frame in the left side of FIG. 14A, and the hardware process is shown in the dashed line frame in the right side of FIG. 14A. FIG. 14B is a pattern diagram showing an operation of the secure hardware in the process of the TLB/AMR registration operation.

The program in use in the processor core 10 (authenticated program), when TLB/AMR error occurs (S120), executes the existing TLB/AMR error process (S121). Details of the existing TLB/AMR error process are public knowledge, and therefore the explanation is omitted in this description.

The program obtains the key ID and the license information (lower 16 bits in the stored 32 bits) from the program management information (S122) and sets the entry number of TLB/AMR where the TLB/AMR error occurred (TLB/AMR registration entry number), the key ID, the license information, and the registration command (entry registration command of the TLB/AMR expansion unit) to a relevant register in the public IF 81 of the secure assist 80 (S123). Afterwards, the program enters into status waiting for the update of the registration state machine of the secure controller 82 (S124).

By the process of step S123, as shown in FIG. 14B, in the public IF 81, the TLB/AMR registration number (the TLB/AMR registration entry number) is set to the register 825, the registered key ID is set to the register 814, the license information is set to the license register 819, and the registration command is set to the command register 816.

When the registration command is set to the command register 816 in step S123, the registration state machine is started by the secure controller 82 in the secure assist 80.

The registration state machine compares the lower 16 bits of the license information set to the register 819 of the public IF 81 with that of the license information registered in the entry designated by the TLB/AMR entry number (S126), and determines whether or not the two match (S127).

The comparison of the license information is performed by the license check unit 65 of the secure pipe 60, as shown in FIG. 14B.

The registration state machine, if the license check in step S127 succeeds (two pieces of license information match), the key ID, and the license information designated by the TLB/AMR entry number of the TLB/AMR expansion unit are updated. The S-bit of the entry (registered key entry) designated by the key ID of the encryption key table 64 is copied to the S-bit of the entry (S128).

The operation of the secure hardware in the process of step S128 is explained with reference to FIG. 14B. The license check unit 65 compares the license information (license check) and outputs the comparison result (license check result) to an AND gate unit 830. When the license information match, the license check unit 65 outputs a signal "1" (success). When two license information does not match, it outputs a signal "0" (failure) to the AND gate unit 830. The S-bit (signal) of the registered key entry of the encryption key table 64 is also output to the AND gate unit 830. The AND gate unit 830 outputs the computation result of the two signals to the entry (registration designated entry) designated by the TLB/AMR entry number set to the register 825 of the TLB/AMR expansion unit 63 and to the processor core 10. By so doing, if the license check succeeds, the S-bit which is registered in the entry indicated by the key ID in the encryption key table 64, is output without being modified to the registration designated entry of the TLB/AMR expansion unit 63 and the processor core 10. The S-bit is copied to the S-bit storage region of the registration-designated entry of the TLB/AMR expansion unit 63 (S-bit update in the TLB/AMR expansion unit 63). The S-bit registered in the encryption key table 64 is also output to the processor core 10 via the S-bit signal line 91. The processor core 10 copies the S-bit input from the S-bit signal line 91 in the S-bit storage region of the relevant entry (the entry corresponding to the registration designated entry of the S-bit updated TLB/AMR expansion unit 63) of TLB/AMR, and updates the S-bit of the relevant entry of TLB/AMR.

When the process of step S128 ends, the registration state machine sets the success status to the registration status register 827 in the public IF 81 (S129). When it is determined that the license information comparison result in step S127 failed, the error status is set to the registration status register 827 (S130).

When the program in execution in the processor core 10 determines that the update of the registration status register 827 implemented in the public IF 81 of the secure assist 80 is completed, it checks the statue set to the registration status register 827. When it is determined that the TLB/AMR registration succeeded, the TLB/AMR registration is terminated (S132). When it is determined that the TLB/AMR registration failed, the operation terminates as an error termination (S133).

As described above, the key ID, the license information, and the S-bit of the key set in the encryption key table 64 are set to the entry of the TLB/AMR expansion unit 63 corresponding to the encrypted space of the key. The key ID links the corresponding entries of the encryption key table 64 and the TLB/AMR expansion unit 63. The S-bit set to the entry of the TLB/AMR expansion unit 63 is copied to the corresponding entry of the TLB/AMR of the processor core 10. As a result, the S-bit of the entry (the entry where the address conversion information of the encrypted space of the key set to the encryption key table 64 is set) of TLB/AMR of the processor core 10 and the S-bit of the corresponding entry of the TLB/AMR expansion unit 63 implemented in the secure pipe 60 of the secure processor are set at the same value.

{TLB/AMR Entry Removal}

The process of the TLB/AMR removal operation is explained with reference to FIG. 15A and FIG. 15B.

Figure 15A:
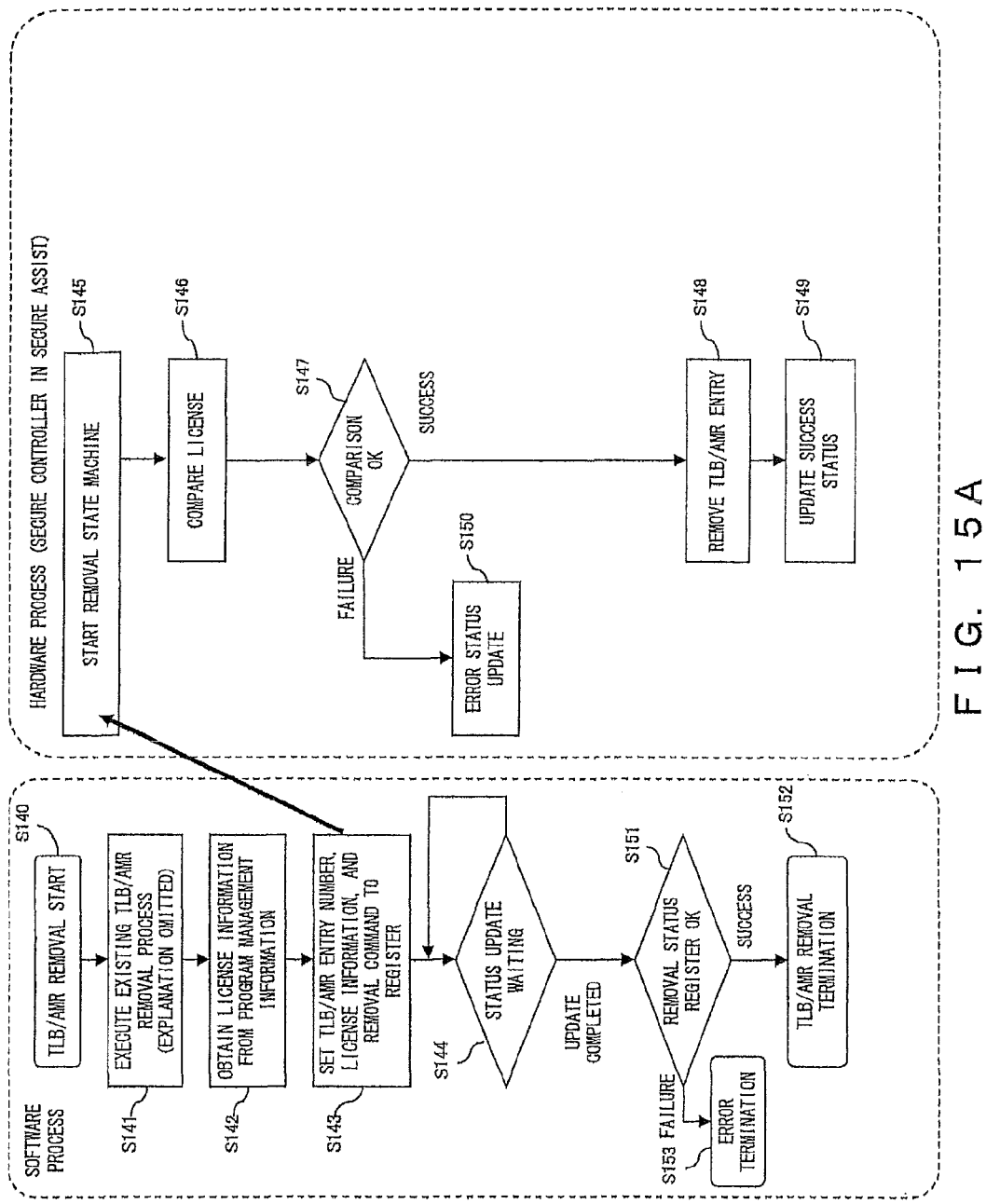
FIG. 15A is a flowchart showing a process procedure of the TLB/AMR entry removal operation performed by linking the software process of the processor core and the hardware process by the secure controller in the secure assist.

FIG. 15A is a flowchart showing a process procedure of the TLB/AMR entry removal operation performed by linking the software process of the processor core 10 and the hardware process using the secure controller 82 in the secure assist 80. The software process is shown in the dashed line frame in the left side of FIG. 15A, and the hardware process is shown in the dashed line frame in the right side of FIG. 15B. FIG. 15B is a pattern diagram showing the operation of the secure hardware in the process of the TLB/AMR removal operation.

The executing program in the processor core 10 (authenticated program), when the TLB/AMR removal process is started (S140), executes the existing TLB/AMR removal process (S141). Details of the existing TLB/AMR removal process are public knowledge, and therefore the explanation is omitted in the description.

The program obtains the license information (the lower 16 bits in the stored 32 bits) from its program management information (S142) and sets the entry number of the TLB/AMR to be removed (TLB/AMR removal entry number), the license information, and the removal command (entry removal command of the TLB/AMR expansion unit) to the relevant registers in the public IF 81 of the secure assist 80 (S143). Then, the program enters into status waiting for the update of the removal state machine of the secure controller 82 (S144).

Figure 15B:
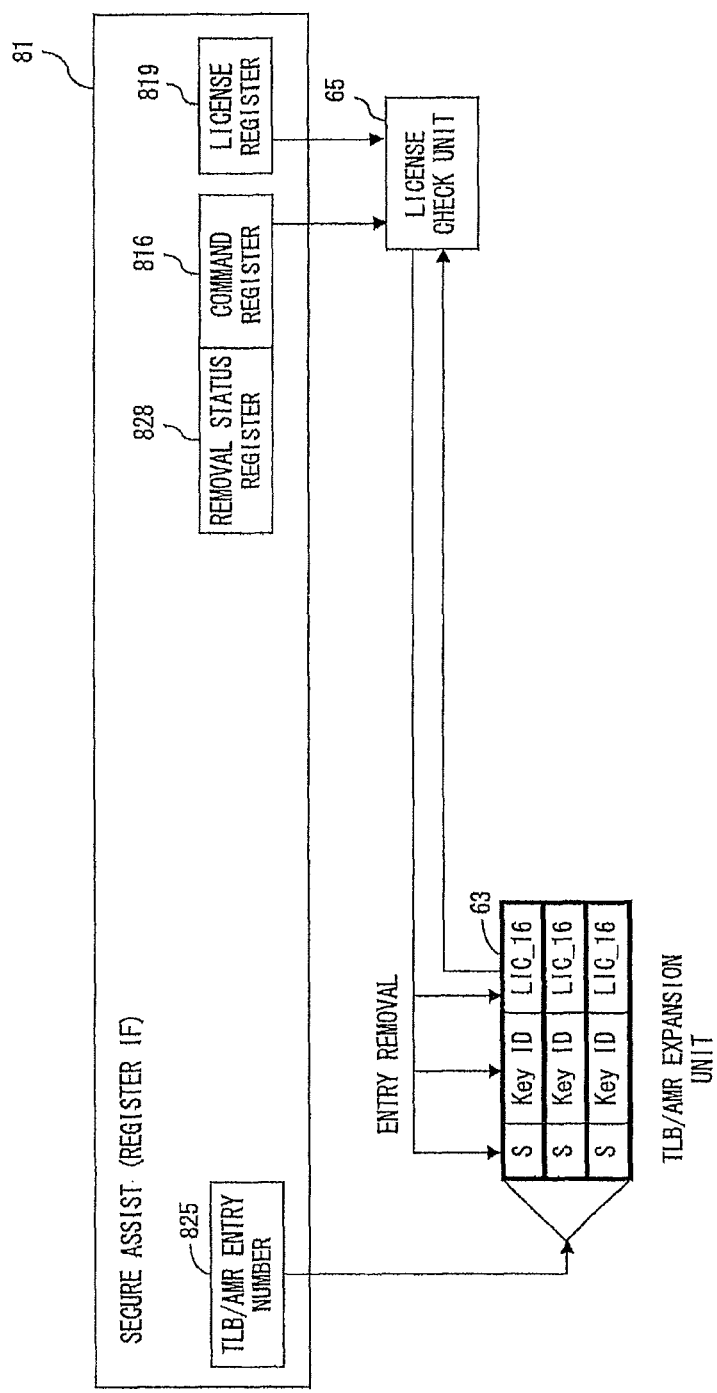
FIG. 15B is a pattern diagram showing the operation of the secure hardware in the process of the TLB/AMR removal operation.

In the public IF 81, using the process in step S143, the TLB/AMR entry number (the TLB/AMR removal entry number) is set to the register 826, the license information is set to the license register 819, and the removal command is set to the command register 816, as shown in FIG. 15B.

When the removal command is set to the command register 816 in step S143, the secure controller 82 | starts the removal state machine (S145).

The removal state machine compares the lower 16 bits of the license information set to the register 816 of the public IF 81 with that of the license information registered in the entry designated by the TLB/AMR removal entry number of the TLB/AMR expansion unit 63 (S146) and determines if the information matches or not (S147).

The license information comparison is performed by the license check unit 65 of the secure pipe 60, as shown in FIG. 15B.

If the license check succeeded (the license information matches) in step S127, the removal state machine removes the entry designated by the TLB/AMR removal entry number of the TLB/AMR expansion unit (S148).

The secure hardware operation in the process in step S148 is explained with reference to FIG. 15B. The license check unit 65 compares the two pieces of license information (license check), and, if the two match, removes the entry designated by the TLB/AMR entry number set to the register 825 of the TLB/AMR expansion unit 63.

The removal state machine, when the process in step S148 ends, sets the success status to the removal status register 828 in the public IF 81 (S149). When it is determined that the license information comparison result failed in step S147, the removal state machine sets the error status to the registration status register 827 (S150).

When the executing program in the processor core 10 determines that the removal status register 828 update implemented in the public IF 81 of the secure assist 80 is completed, the program checks the status set to the removal status register 828. When it is determined that the TLB/AMR removal process succeeded, the TLB/AMR removal is terminated (S152). When it is determined that the TLB/AMR registration failed, the program terminates the process as error termination (S153).

As described above, the authenticated program in execution in the processor core 10 can individually remove the entry of the TLB/AMR expansion unit 63 linked with the key registered in the encryption key table 64 by using the removal command and the license information.

{TLB/AMR Entry Invalidation}

Figure 16:
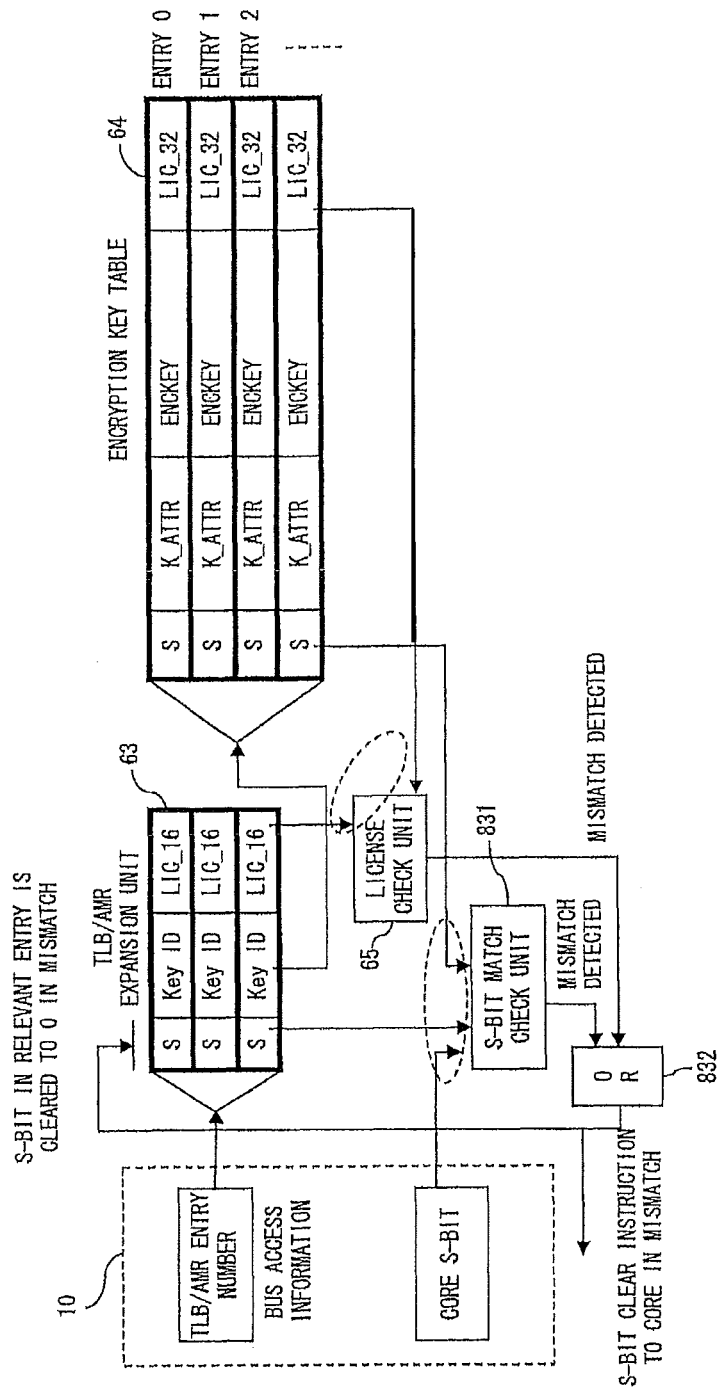
FIG. 16 is a pattern diagram showing the entry invalidation operation of TLB/AMR by the secure processor of the present embodiment.

FIG. 16 is a pattern diagram showing the entry invalidation operation of TLB/AMR by the secure processor of the present embodiment.

The TLB/AMR entries of the TLB/AMR expansion unit 63 and of the processor core 10 are invalidated by clearing the S-bit to "0". In order to validate the entry, re-registration of the entry is required.

The secure processor performs the entry invalidation operation in cases of the following (1) or (2).

(1) If the S-bit of the entry of TLB/AMR of the processor core 10, that of the entry of the TLB/AMR expansion unit 63 corresponding to the above TLB/AMR entry, and that of the entry of the encryption key table 64 linked to the entry of the TLB/AMR expansion unit 63 do not match.

This occurs under the following conditions:
When the key is removed from the entry of the encryption key table 64
When the S-bit of the entry of TLB/AMR of the processor core 10 is cleared to "0"
When the entry of TLB/AMR of the processor core 10 is removed (2) If the license information of the TLB/AMR expansion unit 63's entry and that of the entry of the encryption key table 64 linked to the entry of the TLB/AMR expansion unit 63 do not match.

This occurs under the following conditions:
When the key is removed from the entry of the encryption key table 64
When a key different from the key designated by the entry of the encryption key table 64 is registered The secure processor of the present embodiment realizes the invalidation operation of the TLB/AMR entry using the license check unit 65 provided to the secure hardware, an S-bit match check unit 831, and an OR gate unit 832 performing the processes explained below.

When the program executed in the processor core 10 performs bus access, the entry number of TLB/AMR (TLB/AMR entry number) corresponding to the accessed memory space and the S-bit of the entry are output to the secure hardware.

The license check unit 65 of the secure hardware compares the lower 16 bits of the license information registered in the entry of the TLB/AMR expansion unit 63 corresponding to the TLB/AMR entry number input from the processor core 10 with that of the license information registered in the entry of the encryption key table 64 designated by the key ID registered in the above entry of the TLB/AMR expansion unit 63. If the two do not match, a mismatch detection signal (first mismatch detection signal) is output to the OR gate unit 832.

The S-bit matching check unit 831 of the secure hardware compares the S-bit input from the processor core 10, the S-bit registered in the entry of the TLB/AMR expansion unit 63 corresponding to the TLB/AMR entry number input from the processor core 10, and the S-bit registered in the entry of the encryption key table 64 designated by the key ID registered in the above entry of the TLB/AMR expansion unit 63 with each other If those S-bits are mismatch, a mismatch detection signal (second mismatch detection signal) is output to the OR gate unit 832.

The OR gate unit 832 performs the OR operation on the two mismatch detection signals input from the license check unit 65 and the OR gate unit 832. When the first or the second mismatch detection signal is input, it clears the S-bit of the relevant entry of the TLB/AMR expansion unit 63 (the entry of the TLB/AMR expansion unit 63 corresponding to the TLB/AMR entry number input from the processor core 10) to "0", and instructs the processor core 10 to clear the S-bit output to the secure hardware to "0".

[Data Write Operation of the Secure Pipe]

Figure 17:
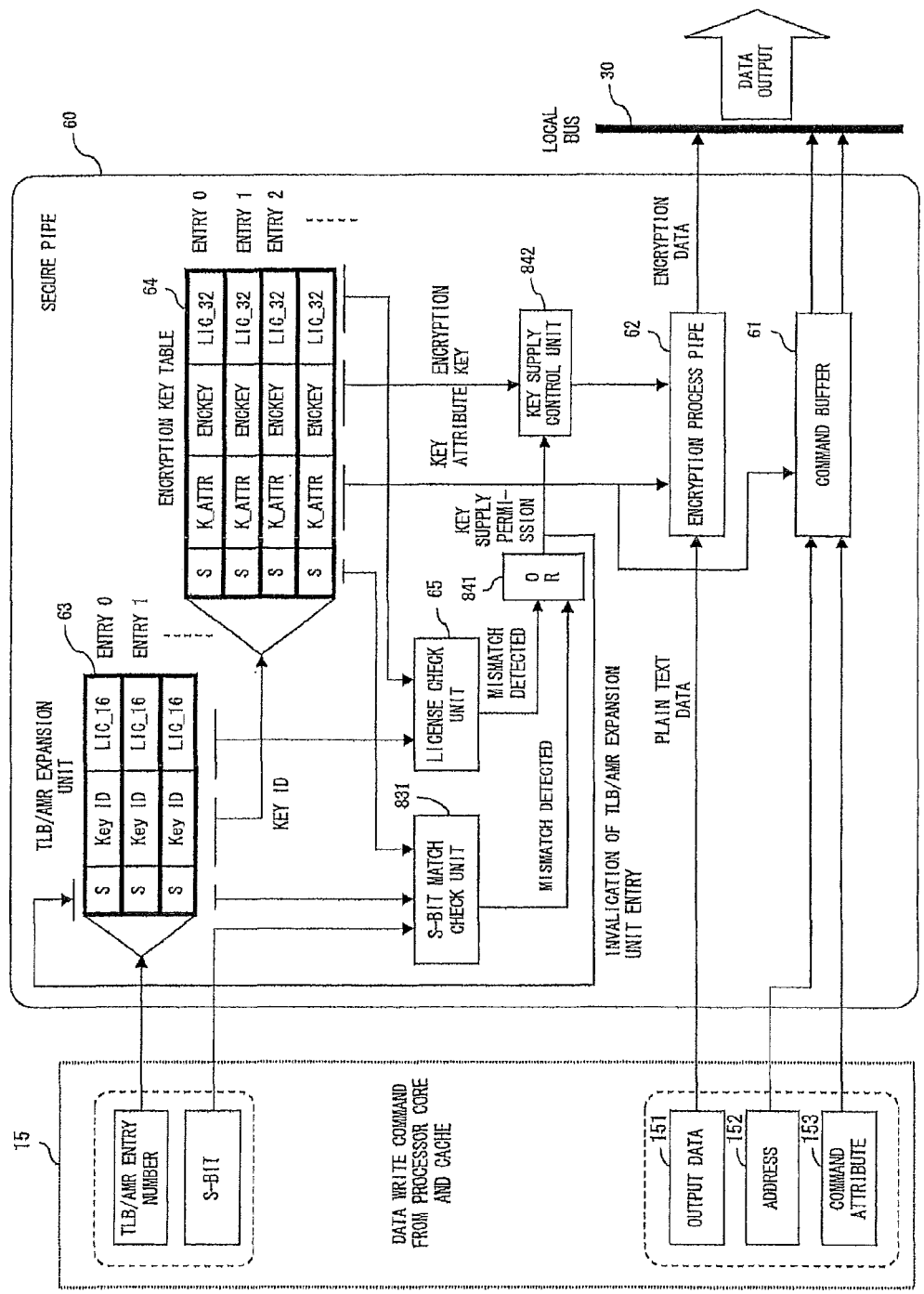
FIG. 17 is a diagram showing the operation of the secure pipe when the program executed in the processor core issues data write command.

FIG. 17 shows a diagram of the operation of the secure pipe 60 when the program executed in the processor core 10 issues the data write command. The rectangular frame with the dashed line in the left side of FIG. 17 shows the data and information output from the CPU core 15 when the data write command is issued.

When the program executed in the processor core 10 issues the data write command, output data 151 to be written (plain text data) is output to the encryption process pipe 62 and the output data's writing address 152 and a command attribute 153 (the attribute showing that the command is a data write command in this case) are output to the command buffer 61. The TLB/AMR entry number of the processor core 10, to which the address conversion information of the memory space where the writing address of the output data 152 belongs is set, and its S-bit are output to the secure pipe 60.

In the secure pipe 60, using the operation same as explained in FIG. 16, the license information and the S-bit mismatch checks are performed in the license check unit 65 and in the S-bit match check unit 831, respectively. Each of the license check unit 65 and the S-bit match check unit 831 outputs a mismatch detection signal to an OR gate unit 841. The OR gate unit 841 performs the OR operation of the two mismatch detection signals, outputs the entry invalidation signal, which is 0 active, of the TLB/AMR expansion unit 63 to the TLB/AMR expansion unit 63 as in the OR gate unit 832 of FIG. 16, and at the same time, outputs a key supply permission signal, which is 1 active, to the key supply control unit 842. The key supply permission signal becomes active when the two mismatch detection signals are not active (when the license information match in the license check of the license check unit 65 and all the S-bits agree at "1" in the S-bit match check of the S-bit match check unit 831).

The key supply control unit 842, after inputting the active key supply permission signal from the OR gate unit 841, reads out the key (encryption key) from the relevant entry of the encryption key table 64 and outputs the key to the encryption process pipe 62. At that point, the key attribute is read from the relevant entry of the encryption key table 64 and is supplied to the encryption process pipe 62 and the command buffer 61. The encryption process pipe 62 encrypts the output data 151 based on the key attribute and the encryption key supplied from the key supply control unit 842 and outputs the encrypted data to the local bus 30. The command buffer 61 temporarily stores the address 152 and the command attribute 153 inputted from the CPU core 15. These are output to the local bus 30 based on the key attribute input from the encryption key table 64 at an appropriate timing in consideration of the delay time of the encrypted data output from the encryption process pipe 62. The encrypted data, address 152, and the command attribute 153 input to the local bus 30 are output to SDRAMC 40 from the local bus 30.

FIG. 18 is a diagram showing the operation of the secure pipe 60 when the program executed in the processor core 10 issues a data/instruction read command. The rectangular frame with dashed line in the left side of FIG. 18 shows the data and information output from the CPU core 15 when the data/instruction read command is issued.

The operation of the secure pipe 60 when the data/instruction read command is issued is basically the same as when the data write command is issued. The differences are that the encryption process pipe 62 decrypts the data or the instruction code (encrypted) read by the SDRAMC 40 based on the key (encryption key) supplied from the key supply control unit 842 and the key attribute input from the encryption key table 64. Another difference is that the plain text data or instruction code obtained by the decryption is output to the CPU core 15 as input data 156.

The address 157 outputted from the CPU core 15 is the data or instruction read address. The command attribute 158 is attribute information of the data/instruction read command. These are output to the command buffer 61 from the CPU core 15 and are output to the local bus 30 from the command buffer 61.

Figure 19:
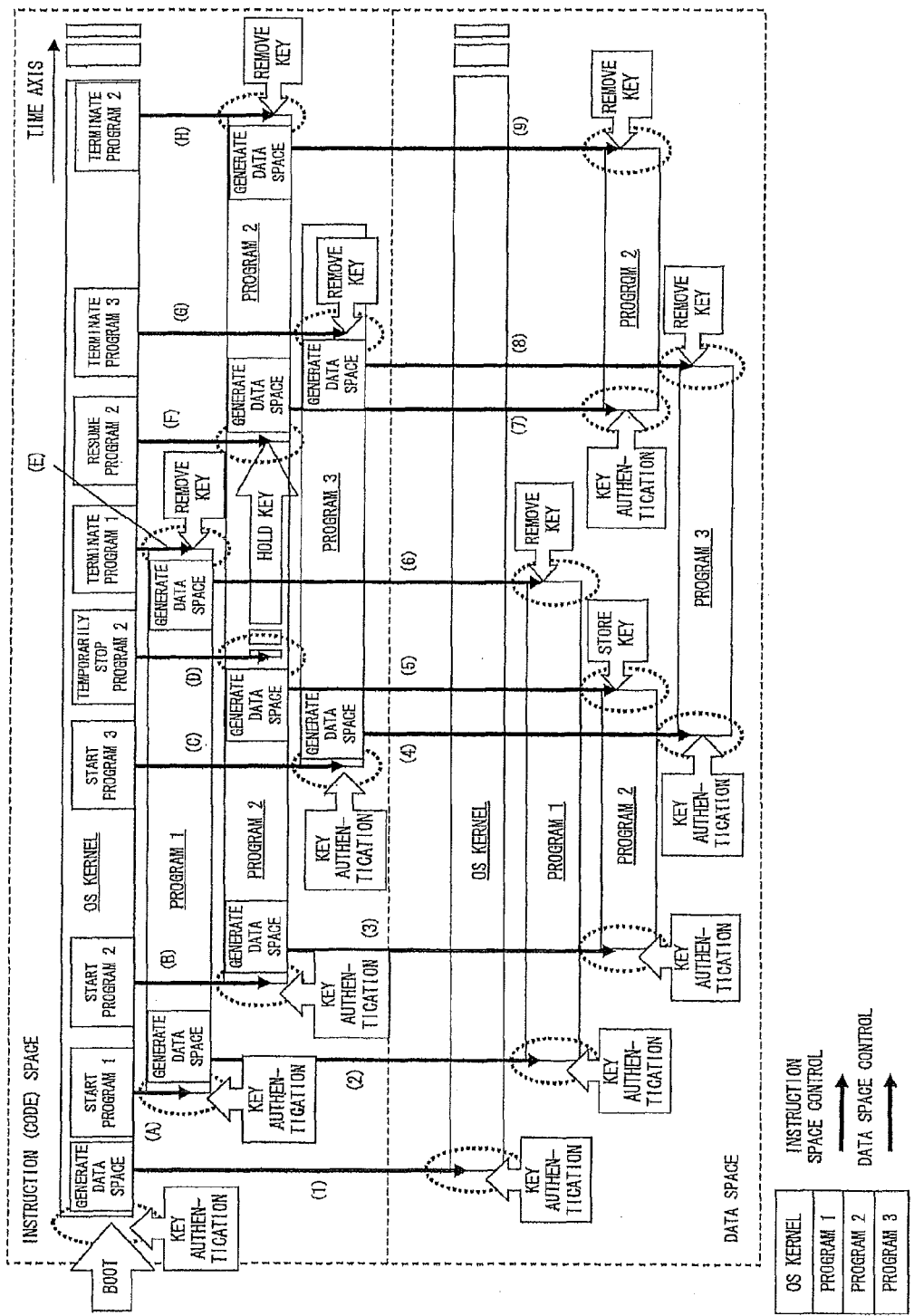
FIG. 19 is a diagram showing the program execution control by the secure processor of the present embodiment.

FIG. 19 is a diagram showing the program execution control using the secure processor of the present embodiment. The rectangular frame with dashed line on top of FIG. 19 represents an instruction (code) space, and the rectangular frame in the bottom represents data space.

FIG. 19 shows an example in which three programs are started after OS booting.

At the time of booting, the OS, as explained above, performs key authentication of an OS kernel (instruction code) using the secure boot program authenticated by the built-in key incorporated in the secure processor. The OS kernel, when OS boots, performs key generation process, secures the data space, and generates data space for its own use (FIG. 19(1)). Next, the OS kernel performs key authentication using the authentication information from program 1 for starting the program 1 (FIG. 19 (A)). The instruction code key of program 1, which is authenticated by the key authentication, is stored in the encryption key table 64 until the termination of program 1. At the termination of program 1, the OS kernel performs key removal of the instruction code of the program 1 (FIG. 19 (E)).

The program 1, because it requires the data space for its own in its operation section, generates the data space by key generation, and performs key removal prior to the program termination after using the data space (FIG. 19 (2) and (6)).

The key registration and the key removal, in association with the data space generation and removal, may be processed by the program operating in the authenticated space such as the program 1, which is a child program, or may be requested to the OS kernel for alternate process.

A program 3 performs the same process as program 1 (FIG. 19 (C), (4), (8), and (G)). A program 2 is an example when the program temporarily stops for some reason. The start and the end of the program 2 are the same as the programs 1 and 3. However, in the temporarily stop process section using the instruction of the OS kernel (FIG. 19 (D) and (F)), the key of the instruction code is stored in the encryption key table 64 without being removed. In the temporarily stop process section, the data key is generated by the key generation process and is stored by the key storage process (FIG. 19 (5)). The key authentication process is performed using the key information when execution is resumed (FIG. 19 (7)), and the data space generated at the time of data key generation (FIG. 19(3)) is reused.

The above embodiment has a configuration, in which, by providing the S-bit to the TLB/AMR entry of the processor core 10, and by outputting the S-bit of the space where the instruction code belongs to the secure hardware when the processor issues an instruction code, determines if the instruction code is authenticated by the secure hardware. However, it is not necessary to provide the S-bit to the TLB/AMR entry of the processor core 10, and it is possible to have a configuration, for example, where the secure pipe 60, when executing the instruction code in the processor core 10, receives the address in which the instruction code is present from the processor core 10 and determines if the instruction code is authenticated.

What is claimed is:

1. A secure processor, which decrypts an encrypted instruction code and executes the instruction code, comprising:
    a processor core configured to execute the instruction code obtained by decrypting the encrypted instruction code;
    a secure bus that is not recognized by a program executed by the processor core; and
    a secure hardware connected to the secure bus, configured to perform authentication of the encrypted instruction code executed using the processor core and performing encryption and decryption of the encrypted instruction code and data that the processor core inputs from and outputs to the outside, wherein
    the secure hardware includes a secure pipe connected to the secure bus, the secure pipe being configured to perform encryption and decryption of the encrypted instruction code and data that the processor core inputs from and outputs to the outside,
    the secure pipe includes:
        an encryption key table with an encryption key, license information of the encryption key, and an entry to register a first flag, which indicates whether the encryption key is reliable or not;
        a TLB/AMR (Translation Look-aside Buffer/Address Map Register) expansion unit with an entry corresponding one-to-one with TLB/AMR of the processor core, the TLB/AMR expansion unit configured to register in the entry, identification information of the encryption key registered in the encryption key table, a second flag, which is a copy of the first flag registered in the entry of the encryption key table designated by the encryption key identification information, and license information; and
        a license check unit to examine whether or not the license information registered in the entry of the TLB/AMR expansion unit matches the license information registered in the entry of the encryption key table designated by the encryption key identification information registered in the entry of the TLB/AMR expansion unit,
    the secure hardware, including a storage unit configured to store a built-in key, is initiated by a secure boot program encrypted by the built-in key,
    the secure boot program serves as a starting point of an instruction code authentication executed by the secure processor, by authenticating a first program which is a user application's core program,
    the first program further authenticates a second program which is different from the first program, by setting an encrypted second program key to the secure hardware, by reading a second program key authentication's status information from the secure hardware when receiving a notification indicating that a key authentication process by the secure hardware to authenticate the encrypted second program key is terminated from the secure hardware, and by determining whether the encrypted second program key is decrypted and authenticated on the basis of the key authentication's status information,
    the first program obtains license information of a decrypted second program key from the secure hardware and sets the license information to the secure hardware, and
    the secure hardware decrypts the second program by using the decrypted second program key and provides a decrypted second program to the processor core.

2. The secure processor according to claim 1, wherein the secure pipe permits access to an authenticated data space only to an authenticated program executed in the processor core.

3. The secure processor according to claim 1, wherein the secure hardware includes a secure assist connected to the secure bus configured to transmit and receive a command and information to and from a program executed in the processor core via a public interface and also to execute a public key system encryption process and a public key system authentication process.

4. The secure processor according to claim 1, wherein the secure hardware includes a secure DMA (Direct Memory Access) connected to the secure bus, comprising a DMA transfer function configured to perform a page verification of an instruction code or data transferred by the DMA transfer function.

5. The secure processor according to claim 4, wherein the secure DMA includes:
    an encryption process unit configured to perform a common key cryptography encryption process; and
    a hashing process unit configured to apply hashing process to data in the DMA transfer region.

6. The secure processor according to claim 1, wherein the entry of TLB/AMR of the processor core includes a third flag having the same function as the second flag of the TLB/AMR expansion unit.

7. The secure processor according to claim 6, wherein the value of the third flag, when it is determined by the license check unit that the license information match each other, is updated to the value of the second flag.

8. The secure processor according to claim 1, wherein an empty entry of the encryption key table is managed by a program executed in the processor core.

9. The secure processor according to claim 1, wherein the secure assist includes:
    a first register, where a command can be set by a program executed in the processor core; and
    a second register, where license information can be set by the program.

10. The secure processor according to claim 9, wherein the secure assist includes:
    an encryption key generation unit configured to generate an encryption key to generate a key to be registered in the empty entry of the encryption key table when a key generating command is set to the first register;
    a license information generation unit configured to generate license information of the encryption key generated by the encryption key generation unit; and
    a third register, which can be accessed by the program, configured to store the license information generated by the license information generation unit.

11. The secure processor according to claim 9, wherein the secure assist includes:
- a public key operation unit configured to public-key encrypt an encryption key corresponding to the license information set to the second register registered in the encryption key table when a key storage command is set to the first register; and
- a third register, which can be accessed by the program, for storing the encryption key public-key encrypted by the public key operation unit.

12. The secure processor according to claim 1, wherein the secure hardware includes:
- a key authentication unit configured to authenticate a public-key encrypted key of an instruction code;
- a license information generation unit configured to generate license information of the public-key encrypted key when the public-key encrypted key is authenticated by the key authentication unit; and
- a key decryption unit configured to decrypt the public-key encrypted key when the public-key encrypted key is authenticated by the key authentication unit,
- wherein license information generated by the license information generation unit is stored by a program in execution in the processor core, which requested authentication to the authentication unit, and the key decrypted by the key decryption unit is registered to the encryption key table.

13. The secure processor according to claim 12, wherein the key authentication unit performs authentication of the public-key encryption key based on an attribute of the public-key encrypted key, a key signature of the public-key encrypted key, a signature verification key of the key signature, and a signature verification key signature of the signature verification key.

14. The secure processor according to claim 1 wherein the secure hardware includes:
- a key authentication unit configured to generate a public-key encrypted key of an instruction code;
- a page verification unit configured to verify the instruction code in units of pages;
- a license information generation unit configured to generate license information of the public-key encrypted key when the public-key encrypted key is authenticated by the key authentication unit and a page of the instruction code is verified by the page verification unit; and
- a key decryption unit configured to decrypt the public-key encrypted key, when the public-key encrypted key is authenticated by the key authentication unit and a page of the instruction code is verified by the page verification unit,
- wherein license information generated by the license information generation unit is stored by an executing program in the processor core, which requested authentication to the authentication unit, and the key decrypted by the key decryption unit is registered to the encryption key table.

15. The secure processor according to claim 14, wherein
the key authentication unit performs authentication of the public-key encryption key based on an attribute of the public-key encrypted key, a key signature of the public-key encrypted key, a signature verification key of the key signature, and a signature verification key signature of the signature verification key, and
the page verification unit performs page verification based on the page signature of the instruction code.

16. The secure processor according to claim 15, wherein the processor core executes only instruction code that is verified by the page verification unit.

17. The secure processor according to claim 1, wherein the second program is a secure application program.

* * * * *